United States Patent [19]
Guthler et al.

[11] Patent Number: 6,164,869
[45] Date of Patent: Dec. 26, 2000

[54] DEVICE FOR INFLUENCING A FLOW OF WASTE WATER

[75] Inventors: Harald Guthler; Ralf Muhlhaupt, both of Kussaberg, Germany

[73] Assignee: Renate Guthler, Kussaberg, Germany

[21] Appl. No.: 09/077,567

[22] PCT Filed: Nov. 30, 1996

[86] PCT No.: PCT/EP96/05311

§ 371 Date: Nov. 29, 1999

§ 102(e) Date: Nov. 29, 1999

[87] PCT Pub. No.: WO97/21005

PCT Pub. Date: Jun. 12, 1997

[30] Foreign Application Priority Data

Dec. 2, 1995 [DE] Germany ............................ 195 45 047

[51] Int. Cl.[7] ............................. E02B 7/16; E02B 8/06; F15D 1/00; F16L 55/02
[52] U.S. Cl. ............................................. 405/87; 251/121
[58] Field of Search ................... 405/52, 77, 80, 405/303, 87, 1; 251/121

[56] References Cited

U.S. PATENT DOCUMENTS

| | | | |
|---|---|---|---|
| 3,464,210 | 9/1969 | Nakajima | 405/87 |
| 4,151,859 | 5/1979 | Jakobi | 137/390 |
| 4,206,783 | 6/1980 | Brombach | 137/808 X |
| 4,800,907 | 1/1989 | Giehl et al. | 134/166 R |
| 4,834,142 | 5/1989 | Johannessen | 137/813 |
| 5,052,442 | 10/1991 | Johannessen | 137/813 |
| 5,080,137 | 1/1992 | Adams | 137/813 X |
| 5,524,393 | 6/1996 | Nill et al. | 405/52 X |
| 5,673,751 | 10/1997 | Head et al. | 166/155 |
| 5,800,092 | 9/1998 | Nill et al. | 405/52 |

*Primary Examiner*—Thomas B. Will
*Assistant Examiner*—Tara L. Mayo
*Attorney, Agent, or Firm*—Bachman & LaPointe, P.C.

[57] ABSTRACT

A method of influencing a flow of waste water in the waste water system of a housing development, in particular for reducing peak flows in these waste water systems. Reservoirs in the waste water system are activated in a surface-covering manner in order to delay discharge.

11 Claims, 27 Drawing Sheets

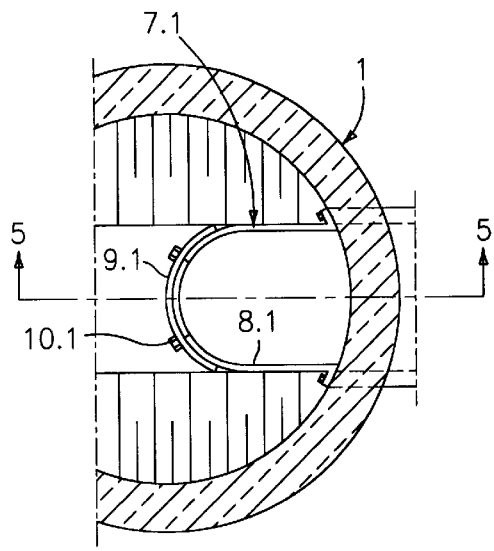
FIG. 4
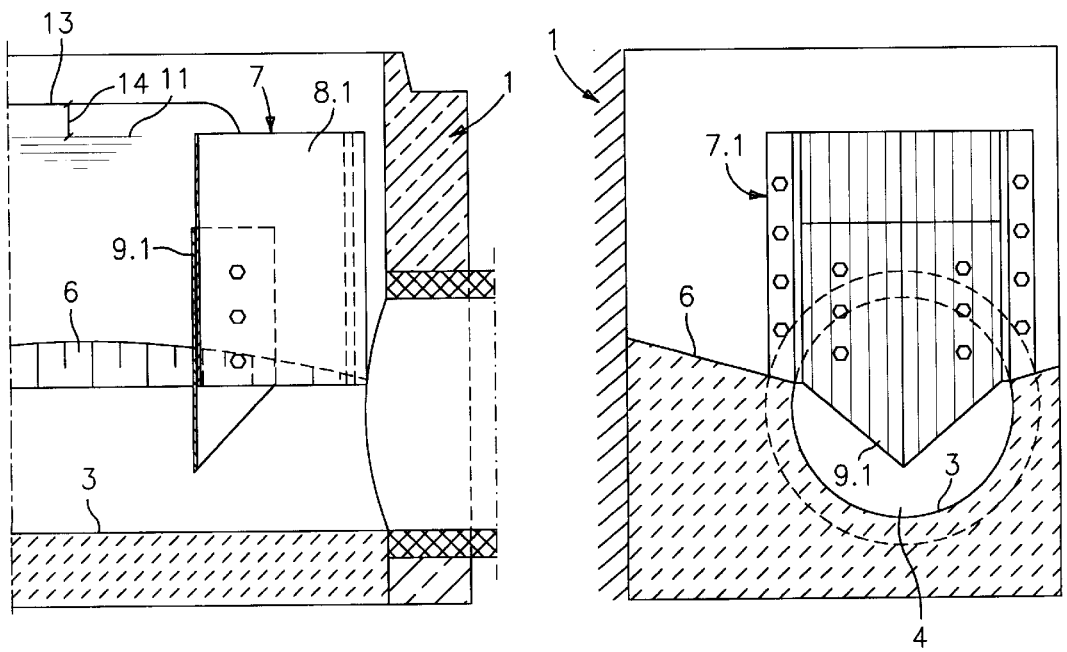
FIG. 5
FIG. 6

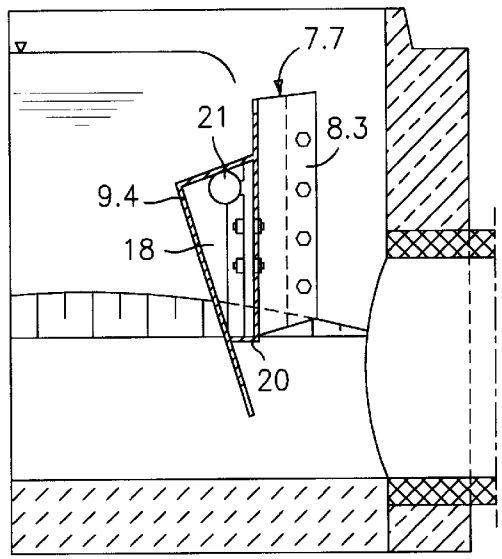
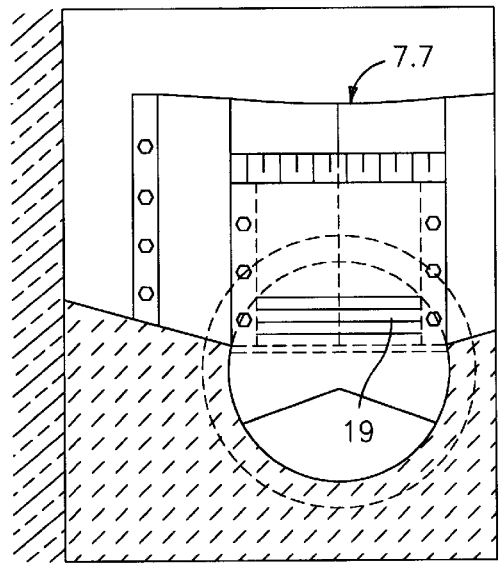
*FIG. 16*  *FIG. 17*
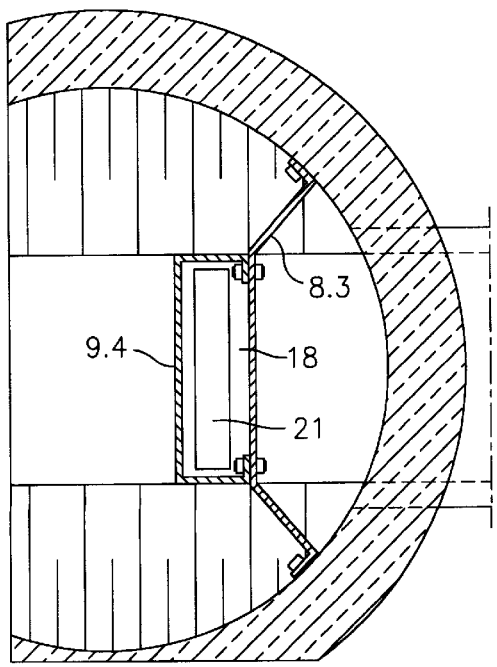
*FIG. 18*

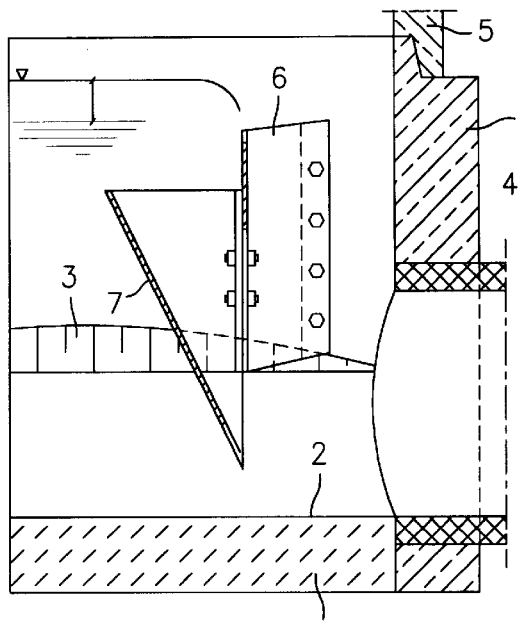
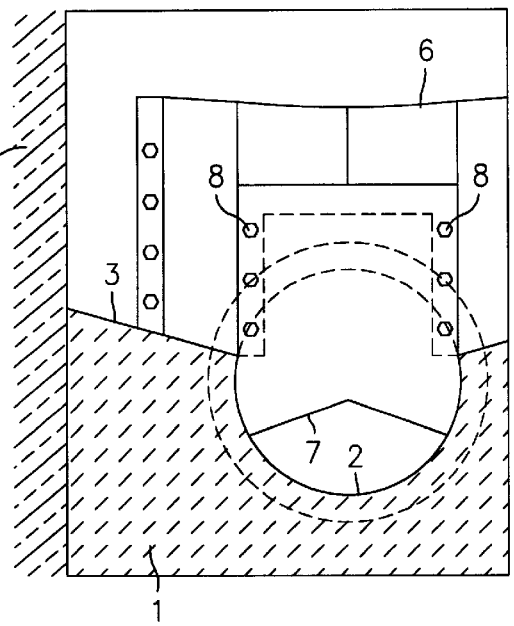
FIG. 45  FIG. 46
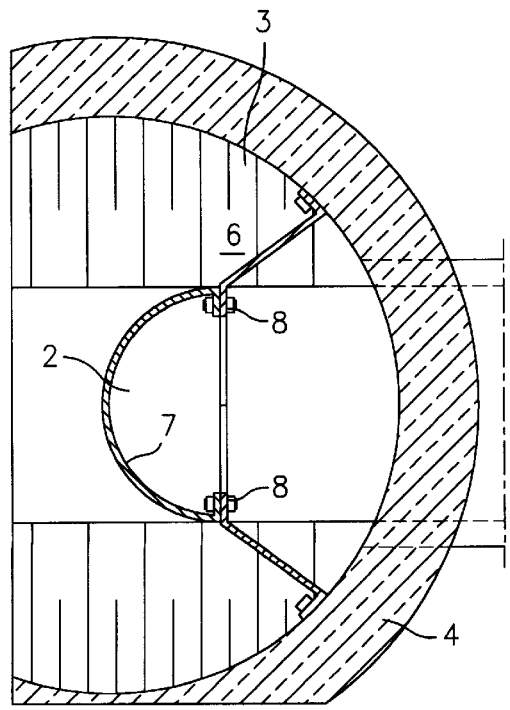
FIG. 47

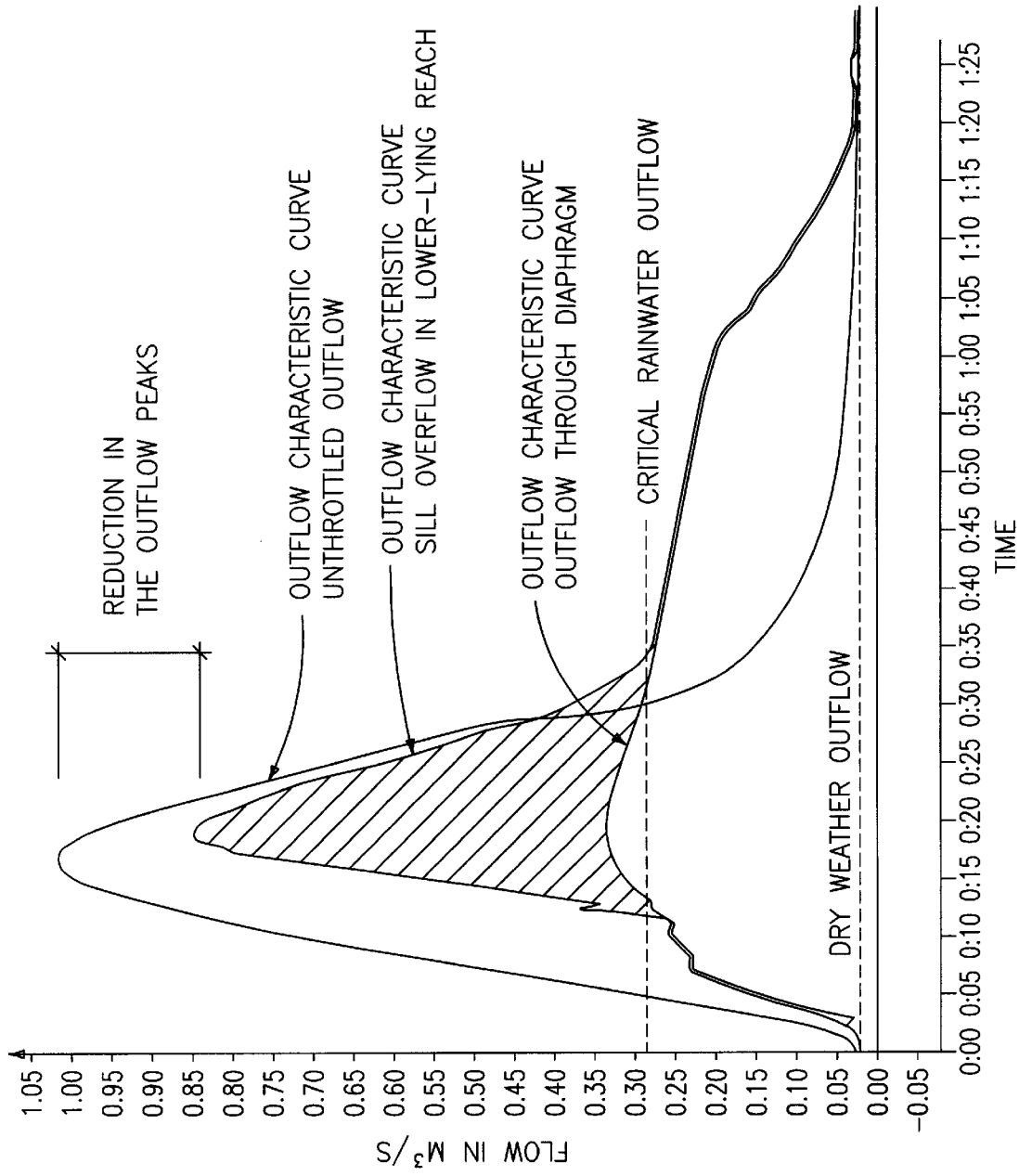

DEVICE FOR INFLUENCING A FLOW OF WASTE WATER

The invention relates to a method for influencing a wastewater flow in a residential area wastewater management system, in particular for reducing the peak outflows in these wastewater systems.

Wastewater systems or sewer systems are marked by an extremely discontinuous input, which for the most part makes the operating sequences impossible to calculate. The only route left to the planner is therefore to provide capacities which are based on the sizing guidelines for peak precipitation levels and are able to absorb even such relatively large amounts of precipitation. It becomes clear in this case that these capacities contain enormous volume reserves under normal operation, and that it was hitherto not possible to make optimum use of said reserves because of a lack of suitable technical equipment.

GB Patent 1 543 374 discloses a system in which retaining sections are connected into a wastewater system. To this end, separate retaining basins are formed, and the wastewater is held back in these. At the end of the retaining section, a manhole is provided, from which the normal wastewater sewer leads on, while at the side the overflow is led off to an outfall.

Also known are throttle slides which, on the one hand, are controlled manually, without additional technical equipment, on the other hand are controlled electrically or pneumatically on the basis of flow measurements. A drainage system of this type is shown, for example, in German Offenlegungsschrift 34 18 813. As a result of a throttling device, the wastewater in the collector backs up, until an overflow, which is arranged upstream of the collector, is reached. The wastewater then passes from this overflow into an outfall. Here, too, separate sewers are necessary for the overflow to the outfall.

Nowadays, however, the introduction of peak rain-water discharges, and hence also of dirt loading, which gets into the watercourses via the rainwater overflows, is intended to be reduced to a minimum, and to be matched to the loading of the respective outfall. By this means, it is intended to reduce the ecological "stress" in outfalls.

The present invention is based on the object of offering a cost-effective solution in order to make existing sewer reservoirs usable and to improve the entire management of wastewater.

The way to achieve this object is by activating existing reservoirs in the wastewater system over a large area in order to retard the outflow.

Present-day wastewater systems, which, on account of being dimensioned to match the sizing guidelines, have transport capacities which are used only a few times per year, specifically about 5–10%, conceal enormous volume reserves which were hitherto unused. Since, within the sense of the sizing guidelines for the configuration of rainwater relief systems in mixed sewers [German ATV A 128], it is permissible to include such storage chambers in the calculation, given clever use of these available retention volumes, it is possible to redimension the previously planned rainwater basins and to reduce them to a minimum size.

The above-mentioned objectives may be realized by intelligent outflow control by means of the throttling elements in the sewer network. In this case, the intention is to produce retardation of the outflow via the selected throttling element, decentrally and in a simple manner, by means of the use of suitable throttling elements, without complicated measurement, control and remote-control engineering. At the same time, this has the result that the sewer network is used as a retention sewer network, and hence the enormous volume reserves can have their function changed to storage volumes which can be included in the calculation in the sense of rainwater treatment.

As a result of the present invention, the peak outflow values, which have been demonstrated using the course of the characteristic curve, for the lower-lying regions are reduced, and hence the frequency and quantity of water when entering the watercourses is reduced. At the same time, there is the possibility that, in this way, existing points of conflict are eliminated by means of this form of outflow retardation, which is carried out at the peripheral regions of the sewer network.

Examples have shown that, given clever utilization of the existing retention chambers, the flow to the watercourse could be reduced to about one third of the accumulating inflow from the catchment area. This provides assistance, in particular, to sensitive watercourses to which, as a rule, a relatively large amount of water flows. The retardation produced in this way in the outfall region has a significant effect overall, regionally to super-regionally.

Outflow retardation, and hence making the mixed water outflow more uniform, is automatically associated with a reduction in the surge loading in the feed to the sewage treatment plant.

As a result of the multiplicity of incorporated throttling elements, it is intended that the sewer network act like a sponge, which empties in a retarded manner, the consequence of which is that the sewage treatment plant is fed with a higher dirt loading, but this does not pass into the outfall. Given a uniform loading, however, the sewage treatment plant is rather more capable of processing this additional loading with dirt than as a result of the known peak surge loadings. This produces not only a contribution to watercourse protection, but also optimized utilization of the sewage treatment plant, and hence improvement to its efficiency, without additional significant costs.

Using this method, it is also intended to achieve the target of producing an outflow retardation as a result of the throttled outflow of mixed water or rainwater, and of using the sedimentation process, which occurs in this case within the wastewater system, to improve environmental protection. During the discharge of mixed water or rainwater, it is intended to make use of all possible retention chambers in the wastewater system in such a way that a retarded outflow, which is reduced as far as possible, takes place via the suitable throttling elements that are incorporated in a specific way at numerous points in the sewer network. The present invention hence differs expressly from the previous fundamental outflow philosophy, which provides for the most rapid possible outflow from the wastewater system. According to the present invention, it is intended in general that a throttled outflow should take place.

Only when all the possible retention chambers in the sewer network have been used in an optimum manner as a result of the filling operation produced in the course of the outflow, are even the throttle elements overcome, so to speak, and the outflow takes place in an accelerated manner. Only in these cases does contaminated wastewater pass to the outfalls. Otherwise, it is only mechanically pre-cleaned mixed water or rainwater that is thrown off or fed, via rainwater overflows, to the outfalls, that is to say to the rivers and streams. As a result of the fact that the originally discontinuous outflow is now made uniform, according to the present invention, utilization of the sedimentation process within the wastewater system also takes place simultaneously, that is to say a higher dirt loading is fed to the sewage treatment plants, given the same inflow quantity, while less dirt loading flows into the outfalls, that is to say into the rivers and streams, given the same inflow quantity.

In parallel with the intended, desired outflow retardation, hydraulically fully loaded or overloaded sewer sections are relieved as a result of the present invention, and points of conflict in the sewer network are sharply reduced. The consequence of this is that the originally hydraulically overloaded sewer sections now experience relief, as a result of the reduction in the peak outflow, so that their renewal for reasons of hydraulic overloading is no longer necessary.

According to the invention, the incorporation of throttling elements is simulated by means of a dynamic outflow calculation in the wastewater system. A desired outflow is produced and, by iteration and optimization steps, is improved to such an extent that, in spite of a reduction in the flow velocity, there is still a sufficient outflow, but at the same time adequate sedimentation takes place in the wastewater system. During this simulation, a specific calculation method with integrated characteristic curve is used. In addition, a display is given of those back-up levels which are intended to be produced as a result of the retarded outflow.

In principle, the result of the inventive method should be comparable with a sponge, which has absorbed to its fullest extent and only provides the outflow with the quantity which, on the one hand, is to be expected of the sewage treatment plant and, on the other hand, can be expected of the outfalls on the basis of their loadability.

Making use of the available sewer reservoirs leads to savings in costs in the case of excess stormwater basins or rainwater settlement basins or rainwater retention basins that are newly to be constructed, as a result of saving basin volume. It is not necessary for any volume in the above-mentioned basins to be formed for the wastewater volume which is retained in the existing wastewater system by the throttling element. The volume there can therefore be significantly reduced, which leads to considerable savings in costs. The retained volume is formed by optimum utilization of the piped volumes in the wastewater system. It is also possible for manholes to be used at the same time to a low extent. A cost-effective way is indicated of equipping both existing sewer systems and sewer systems to be newly constructed with the inventive device, the highest possible degree of operational reliability being provided with, at the same time, easy servicing, with the result that the operating costs may be reduced to an absolute minimum. As a result of the outflow retardation, it is possible for unacceptable flooding and back-ups, which occur in the more remote sewers located at the top, and can be traced back to flow processes at different speeds in the case of inadequately dimensioned sewers or in the case of hydraulically deficiently designed connections, to be reduced in terms of their frequency or generally prevented.

The inventive throttling element can be incorporated for all sewer diameters, both subsequently, using the widest possible range of constructional materials, and in the course of new constructions, likewise using suitable constructional materials, such as concrete, sheet steel or plastic. Incorporation is carried out wherever the arrangement of a retained volume proves to be correct or necessary on the basis of calculations. To this end, a calculation method that is specifically related thereto is used.

The throttling element is preferably composed of a sewer retention diaphragm and an adjusting wedge diaphragm. The adjusting wedge diaphragm is used for fine-tuning the flow quantities. Said diaphragms are produced in all the dimensions that are necessary in wastewater systems and are implemented using constructional materials chosen on the basis of their static properties or corrosion resistance or expediency. In particular, mention is made here of the constructional materials concrete, stainless steel, galvanized steel or plastics of all types.

The throttling element according to the invention should also be of self-cleaning design. To this end, it is placed in a wedge shape or curve with respect to the flow direction, so that, in the event of any back-up, eddies are formed, and these prevent solid articles sticking fast or jamming on the throttling elements.

In the case of retrofitting existing wastewater system sections, the dimensions of the throttling element could exceed the diameter of the manhole openings. For this reason, the throttling element is preferably produced in many parts as an outflow brake, so that it can be assembled and fastened in the manholes. In order to connect the individual parts of the throttling element, a steel plate is optionally fitted to a part by welding on, riveting on, screwing on or fitting with a plug-in connection, said steel plate in turn being connected with the aid of connecting means to the composite element fitted to the other part. For example, the assembly of sewer retention diaphragm and adjusting wedge diaphragm takes place in this way.

Otherwise, sewer retention diaphragm and/or adjusting wedge diaphragm do not always need to be shaped from round metal plate or the like. In particular, the adjustable wedge diaphragm may also have a vertically rectilinear or inclined shape. There are also pull-forward, round inflow faces or set-back round inflow faces or any other shapes. No limit is intended to be placed on the invention here.

| | Additions and changes to the "Styx" outflow brake |
|---|---|
| 1. | Adaptation of the outflow opening |
| 2. | changing the overflow |
| | a) inclined overflow |
| | b) notched overflow |
| 3. | Inclined position of the brake |
| 4. | Surge retaining shaft |
| 5. | Spindle for setting the outflow opening |
| 6. | Multipart design |
| 7. | a) Rectilinear, vertical sheet-metal shape |
| |    I) inclined inflow face, rectilinear |
| |    II) inclined inflow face, round |
| |    III) inclined inflow face, pulled forward, round |
| |    IV) inclined inflow face, set back, round |
| | b) Rectilinear inclined sheet-metal shape |
| |    I) rectilinear inflow face |
| |    II) round inflow face |
| 8. | Method of the "Styx" braked outflow |
| 9. | Name "Styx" outflow brake |
| 10. | Flushing box |
| 11. | Brake without adjusting diaphragm |

1. Adaption of the outflow opening (FIGS. 19, 20, 21)

In order to enable the coarse materials contained in the wastewater to have an unimpeded outflow, the adjusting diaphragm is no longer constructed as a wedge that projects into the flume, but is adapted to the flume profile. The diaphragm also receives a triangular cutout, opposite the floor, said cutout ensuring the free passage, required by the ATV; for a bowl of Ø 200 mm.

In addition, by keeping to the normal outflow flume, less turbulence is generated, and this in turn has a hydraulically more beneficial effect on the outflow behavior.

Key to FIGS. 19–30, 36–65:
1 Profiled concrete on subbase
2 Manhole flume floor
3 Continuous footing
4 Manhole lower part
5 Manhole ring
6 Self-cleaning outflow brake
7 Adjusting diaphragm
8 Fastening screws
Different key for FIGS. 31–33:
1 Profiled concrete
2 Subbase
3 Manhole flume floor
4 Continuous footing
5 Manhole lower part
6 Manhole ring
7 Diaphragm crossmember (concrete)
8 Adjusting diaphragm (stainless steel)
9 Self-cleaning steel diaphragm (stainless steel)
10 Fastening screws
2. Changing the overflow (FIGS. 22–24 and FIGS. 25–27)
   Changing the overflow contains two possible versions:
   inclining the overflow (Picture 2)
   notching the overflow (Picture 3)
   The result of this measure is intended to be that the overflow takes place in a concentrated manner specifically at the front region of the diaphragm.
3. Inclined position of the brake (FIGS. 28–30)
   The brakes can also optionally be incorporated inclined with respect to the flow direction. As a result of this measure, the turbulence which occurs in the event of a possible overflow is minimized and, as a result, hydraulically more favorable outflow conditions are provided (e.g. lower input of air into the lower-lying reach).
   In addition, the water flowing away on the rear side of the brake has the effect of improving the free-flushing effect in the event of the outflow opening becoming diverted or blocked.
4. Surge retaining shaft (FIGS. 31–33)
   When designing sewer sections, steps in the bottom (bed drops) are needed in many cases on economic and hydraulic grounds.
   If, in addition, the outflow brake is to be incorporated at these points, the design of a so-called surge retaining shaft is necessary.
   The surge retaining shaft is produced from a conventional prefabricated manhole, into which profiled concrete is incorporated in order to form the dropped-bed flume.
   The diaphragm crossmember is fastened to the manhole wall at the appropriate height, and thus enables a build-up in front of the bed-drop edge.
5. Spindle for setting the outflow opening (FIGS. 34 and 35)
   The fitting of a spindle to the outflow brake enables the continuous setting of the outflow opening.
   Using the spindle, it is then possible to carry out the regulation of the outflow opening even from outside the throttle superstructure, so that entering the corresponding superstructure no longer becomes necessary.
   The operation of the spindle is in this case carried out from the ground at the upper edge of the superstructure, via a slide-valve cap.
   The spindle comprises a threaded rod, which enables the outflow opening to be adjusted via a guide thread fastened to the manhole wall.
6. Multipart design (FIGS. 36–38 and FIGS. 39–41)
   In the event of retrofitting existing sewer sections, the dimensions of the outflow brake may exceed the diameter of the manhole opening.
   For this reason, the outflow brake is produced in many parts, so that it can be assembled and fastened in the manholes.
   In order to connect the parts of the brake, a steel plate is fitted to a part, optionally welded on, riveted on, screwed on or fitted using a plug-in connection, said plate being connected with the aid of connecting means to the composite element fitted to the other part.
7. a) Rectilinear, vertical sheet-metal shape
   The outflow brake is no longer produced from round sheet metal, but receives a vertical and rectilinear sheet-metal shape.
   It is now possible for different oblique inflow faces to be fastened upstream of this braking part
   rectilinear inflow face (FIGS. 42–44)
   round inflow face (FIGS. 45–47)
   round, pulled forward inflow face (FIGS. 48–50)
   round, set-back inflow face (FIGS. 51–53)
   b) Rectilinear or round, inclined sheet-metal shape (FIGS. 54–59)
   Instead of the rounding, a sheet-metal shape that is inclined with respect to the flow direction and is rectilinear or rounded off at the front is produced.
8. Method of the "Styx", braked outflow (FIGS. 66–68)
   In the method of the "Styx" braked outflow, a sewer network area is equipped over a large area with the "Styx" outflow brake.
   The effect of equipping over a large area is optimal activation of the total usable retention volumes that are available in this region.
   This method can be compared, in terms of its properties, with a sponge, which initially absorbs the accumulating water. In the case of a rainwater event, the major part of the accumulating quantities of water is intercepted in the activated storage chambers, is retained, and output again only gradually.
   The significant or decisive part in order to achieve this effect is the successive arrangement of outflow brakes. One outflow brake or individual outflow brakes do not produce this effect.
   The effect of the braked outflow is that outflow fluctuations between peak outflow and normal outflow (dry weather outflow) are reduced, and the outflow is made more uniform (see also the report for the Sachsenlandkurier!)
   Objectives
   Reduction of costs
   High contribution to environmental protection
10. Flushing box (FIGS. 60–62)
    In the case of the possible brake forms, a flushing box is integrated or placed upstream.
    In the event of water building up upstream of the brake, the flushing box is filled via a suitable diaphragm.
    The filled flushing box empties itself automatically as the pressure reduces, and as a result carries out final flushing of the sewer.
    The emptying process takes place with a delay in relation to the outflow into the sewer. This is produced by means of a mechanism which regulates the retarded opening operation of the closure flap. A surge can be produced only in this way.
    After the flushing box has been emptied, the closure is locked as the water level rises once more.
    The control of the locking and unlocking of the closure flap is carried out mechanically or pneumatically with the aid of floats located inside or outside the flushing box.
11. Brake without adjusting diaphragm (FIGS. 63–65)
    In the case of this form of the brake, the upstream adjusting diaphragm is omitted. The outflow opening is integrated directly into the brake parts, with the previously calculated dimensions. A subsequent adjustment or changing of the outflow opening is neither desired or provided.

The rounding of the overflow and flow edges is carried out in order to improve the overflow and flow capacity. This produces the form which is hydraulically most beneficial.

---

COST REDUCTION AND ENVIRONMENTAL PROTECTION BY ACTIVATING EXISTING RETENTION VOLUMES WITHIN RESIDENTIAL AREA WASTEWATER MANAGEMENT SYSTEMS BY MEANS OF AN OUTFLOW BRAKE
List of contents 1. Preamble/foreword
2. Development of novel technical equipment
3. Stimulus for the development
4. Objectives/requirements
   4.1 Reducing the loading on watercourses from stormwater
   4.2 Reducing new constructions by using previously unused storage
   4.3 Determining points of conflict in the network
   4.4 Reducing the frequency of overflow
   4.5 Optimizing the efficiency of the sewage treatment plant by making full use of the permissible loading
5. Solutions by means of outflow control
6. Application/projects
   6.1 Project 1
   6.1.1 Objective/project aim
   6.1.2 Solutions and actions
   6.1.2.1 Version 1
   6.1.2.2 Version 2
   6.1.2.3 Version 3
   6.1.3 Costs
   6.2. Project 2
   6.2.1 Objective/project aim
   6.2.2 Solutions and actions
7. Significance of the novel development
   7.1 For environmental protection
   7.2 For the communities (clients)
8. Summary

---

Cost reduction and environmental protection by activating existing retention volumes within residential area wastewater management systems by means of an outflow brake 1. Preamble/foreword A novel development will become known in the coming years, specifically the "Styx" braked outflow method. The use of this method, named after the river in the underworld in Greek mythology, is intended to achieve high aims, depending on the problem and objective. In addition to the self-evident objectives of integrated environmental protection, such as the avoidance or reduction of overflows and the input of dirt into rivers and streams, savings are made when rebuilding, renovating and expanding sewer networks, and in the case of rainwater basins.

Practical examples make the success of the novel method clear. A further application is being prepared, with a scientific accompaniment, in order to represent all the advantages, including those in the context of comparative measurements and calculations.

2. Development of novel technical equipment

As is known, outflow control in order to achieve a braked or throttled outflow may be produced using technical equipment. Available for this are instruments from measurement, regulation, control and remote-control engineering, as well as simple mechanical engineering equipment. This also includes the throttling elements that are on the market. On closer consideration, different results are produced, when using the generally known throttling elements, which on the one hand relate to the efficiency and on the other hand relate to the price/performance ratio.

What is desired in a brake is in the form of a throttling element which operates inexpensively, simply, serviceably and in an operationally reliable manner. Added to this is the fact that, as a result of the use of this element, the efficiency of the sewer net work must not be impaired.

The "Styx" out flow brake constitutes such an element, and is described as follows:

The brake comprises a stationary, round-shaped part, which may be made of plastic or stainless steel or even of concrete. Upstream of this stationary element, a movable part which projects into the manhole flume is incorporated in such a way that, as a rule, the dry weather outflow can flow away unimpeded and without being backed up.

Depending on the diameter of the sewer, it may be desirable for the calculation to enable a flow opening which, at a critical rainwater outflow quantity of $q_{crit}$=15–30 l/s×ha, already has the effect of impounding. It is also conceivable in other cases for an outflow retardation to be established as a result of backing up in the event of more water accumulating than in t he case of dry weather outflow.

As the retained level increases, the flow at the floor opening increases in accordance with the formula $$Q = \mu \times A \times 2gh$$

In the case of a retained level that is constant during the calculations it is intended for the amount of water that flows through th e opening to be that which is generally calculated as the gravity outflow, that is to say $Q_{max}$. To this extent, in the calculation there is an interplay between the opening at the floor and the retained level at the diaphragm overflow. This ensures that the efficiency of the sewer section is not impaired.

Of course, it is left up to the planner to set this retained level variably, as he considers to be correct and necessary after he has seen the survey documents and in accordance with the state of the sewer.

At any time, the overflow sill makes an overflow in an emergency, so that it is in no way possible for a hazardous back-up to be produced in the sewer network. In the event of rain, however, such a blockage is ruled out, since bulky material is immediately driven to the side as a result of the rounding of the front edge.

Within the context of a cost comparison calculation, it was possible to ascertain that, taking the route of the outflow brake, a sewer volume that could be included in the calculation was produced significantly more cost-effectively than new rainwater retaining volumes as a result of the new construction of an excess stormwater basin.

On average, the cost savings in this case have been calculated to be up to 70% of the costs per cubic meter of retaining volume produced.

The equipment can be accommodated in an existing manhole, so that there are no restrictions in the region of the fall or continuous footing.

In order to be able to introduce the element into existing manholes, it has to be introduced in many parts through the relatively narrow opening of the manhole entry. The use of the "Styx" outflow brake in new man-holes is significantly simpler, since a cost-effective design is generally achieved via the traditional manufacturing route.

The result may be made clear via the newly calculated outflow characteristic curve by comparison with the characteristic curve without impoundage.

It is readily possible to demonstrate both a reduction in the outflow peak and also the making of the outflow more uniform, using the course of the characteristic curve. In various cases, the peak outflow has even been reduced by approximately 2/3 of the normal outflow.

3. Stimulus for the development

The subject "Activation of existing retention volumes" has been discussed as long as there have been sewer networks.

This subject has the highest topicality nowadays. It is impossible to turn a deaf ear to the call to elaborate alternative, cost-effective solutions in the coordination and optimization of sewer outflow transport as a supplement to the previous practices.

There are good reasons to reconsider the previous forms of wastewater disposal. This has been shown by investigations and practical experience.

Sewer systems are marked by an extremely discontinuous input, which for the major part makes it impossible to calculate the operating sequences. The only route left to the planner is therefore, on the basis of the sizing guidelines from peak levels of precipitation, to provide capacities which are able to accommodate even such relatively large amounts of precipitation.

In this case, it becomes clear that, during normal operation, these capacities contain enormous volume reserves, which could not hitherto be used in an optimum manner because of a lack of suitable technical equipment. It is now possible to change this.

In order to pick up the subject, there are two items in the background:

1. Because of a lack of means, communities are not readily able to carry out previous tasks relating to rainwater treatment in a serious manner.
2. The previous options for protecting watercourses can be achieved only very cost-intensely using the existing methods via the route involving outflow control by means of EDP-aided measurement, control and remote-control technology and expensive rainwater basins. The means for this are barely available to an adequate extent. Inexpensive solutions are sought.

4. objectives/requirements 4.1 Reducing the loading on watercourses from stormwater The introduction of peak rainwater outflow quantities and hence also of dirt loading, which takes place into the watercourses via stormwater, is intended to be reduced to a minimum and adapted to the loading on the respective outfall. By this means, it is also possible to reduce ecological "stress" in outfalls.

Previous measures, such as constructing excess stormwater basins and retention sewers, certainly met the requirements of the guidelines, but were not able to take into account all the cases of loading, precisely in the case of overflows of stormwater that were connected one behind the other. In this case, the reduction in the peak outflow transport would be of significant effect.

4.2 Reducing new constructions by using previously unused storage

A sewer system which, because of being dimensioned to match the sizing guidelines, has transport capacities which are used only a few times per year, specifically about 5–10%, conceals enormous volume reserves which were previously unused. Since, within the sense of the guidelines for the sizing and configuration of rainwater relief systems in mixed sewers [German ATV A 128], it is possible to include such storage chambers in the calculations, given clever use of these available retention volumes redimensioning of the previously planned rainwater basins can be carried out, and reduced to a minimum size.

It is precisely in the case of unmanaged and uncontrolled sewer systems that it becomes clear that the available storage capacities there must necessarily remain unused.

4.3 Eliminating points of conflict in the sewer network

As a result of concentrating the mixed water outflow, points of conflict are produced in the sewer network at topographically difficult obligatory points or low points, so that unacceptable backing up, in conjunction with consequential damage, results there. Such events are promoted by hydraulically unfavorably designed interlinking or combining constructions.

In most cases, there are at the same time free sewer chambers unused and available at another point.

4.4 Reducing the frequency of overflow at outfalls

Let us imagine a sensitive stream with a low normal outflow rate, said stream being permanently taken out of ecological equilibrium as a result of surge loading consequent upon the introduction of wastewater from rainwater or mixed sewers and being subjected to continuous ecological stress. Add to this the fact that scouring or erosion and flooding occur as a result of these surge loadings, with consequential damage.

As a rule, this does not occur at a single point but continuously over the entire length of the stream or river, at the region of confluence with the next river and further downstream.

In this case, we assume that, at the time of the introduction into the watercourse, all the available collectors and stores have reached their capacity limits. This is just not so in many cases.

4.5 Optimizing the efficiency of the sewage treatment plant by making full use of the permissible loading Sewage treatment plants are subject to fluctuations in the operating sequence, as a result of the discontinuous inflow of dirty or mixed water, and these fluctuations can only be compensated for by appropriate reserves in the basins. As a result, there are also capacities present which are used fully only in the case of surge loading.

It would be desirable to make optimum use of these reserves in such a way that it is possible to clean a larger part of the contaminated rainwater than hitherto.

5. Solutions by means of outflow control

The above-mentioned objectives may be realized by intelligent outflow control by means of a braking member in the sewer network. In this case the intention is to produce outflow retardation via the selected throttling element, in a simple way and decentrally, by using a suitable throttling element, without complicated measurement, control and remote-control engineering. At the same time, this has the consequence that the sewer network is used as a retention sewer network, and hence the enormous volume reserves may have their function changed to storage volumes which may be included in the calculation in the sense of rainwater treatment.

The result of these measures is that the peak outflow values, demonstrated using the course of the characteristic curve, for the lower-lying regions are reduced, and hence the frequency and amount of water when it is input into the watercourses is reduced. At the same time, there is the possibility of eliminating existing points of conflict in this way as a result of this form of outflow retardation, which is carried out at the peripheral regions of the sewer network.

Examples have shown that, given clever utilization of the available retention chambers, the inflow to the watercourses could be reduced to about ⅓ of the accumulating inflow from the catchment area.

Hence, in particular, aid is provided for the sensitive watercourse, to which as a rule a relatively large amount of water certainly flows. The retardation that is produced in this way in the outfall region has a significant effect overall, regionally to super-regionally.

Retarding the outflow, and hence making the mixed-water outflow more uniform, it automatically accompanied by a reduction in the surge loadings in the inflow to the sewage treatment plant. By means of a multiplicity of incorporated throttling elements, the sewer network is intended to act like a sponge, which empties in a retarded manner, which certainly has the consequence that a sewage treatment plant has a higher dirt loading fed to it. However, in our opinion, said sewage treatment plant is more able to process this additional loading, given uniform loading, than as a result of the known peak surge loading.

This produces a contribution to watercourse protection since, without additional significant costs, optimum utilization of the capacity of the sewage treatment plant and hence an improvement in its efficiency is achieved.

6. Application/projects 6.1 Project 1

6.1.1 Objective/project aim

In the course of road widening and the provision of a footway and cycleway during the construction of a ringroad, additional sealed areas are produced, the result of which is an increased accumulation of rainwater. This rainwater has to be fed to the municipal stream close by. However, the municipal stream, as an outfall, has to be classified as sensitive to the highest degree, and has already been afflicted at various points by flooding and scouring. To this extent, it would be difficult for the outfalls to accept and discharge the additional quantities of water without additional extension measures in the sense of extending a watercourse in a natural manner, which would be associated with high costs.

Definitive statements as to what quantity of water can now be expected of this municipal stream as outfall could not yet be made at that point in time, since an appropriate expert opinion was not yet available.

In order not to have to accept the time delay which was produced as a result as an impediment to the planned road construction, a proposal was worked up to the effect that the outfall should not have fed to it more than the amounts of rainwater that previously accumulated in any case.

6.1.2 Approach to the solution and actions

In order to solve this problem, various versions were investigated and compared.

6.1.2.1 Version 1 envisaged introducing the accumulating rainwater, via road and ditch entries and by means of a transport sewer Lo be newly constructed, into a retaining basin located at the end of the extension section, and to feed it from there to the outfall in a metered fashion. However, this initially plausible solution has the disadvantage that feed and discharge rainwater sewers have to run via private properties, and even the rainwater retaining basin would be located on a private property, so that it would be necessary here to solve the question of compensation, of maintenance up to the possible acquisition of real estate, possibly even within the context of a planning permission hearing. Moreover, the extension of the basin, on the basis of the experience previously gained, would lead to high costs. These were estimated to be about DM 250,000.

6.1.2.2 Version 2 provided for the connection of the street drainage sewer to the inner-city rainwater sewer network. However, the latter is being investigated at present, and the possibility of connection was classified as questionable, because of possible hydraulic overloading, particularly since the problem of discharge into the outfall was merely transferred from one responsible body to another.

6.1.2.3 Version 3 provides revising the rainwater sewer to be newly constructed at the planning stage in such a way that a retention sewer is produced from it. The retention sewer is intended to have the same properties as a retention basin. However, in comparison with the latter, the introduction into the outfall is made at two points.

In order that the retention volume can actually be produced as well, in view of the relatively steep lie of the land, constructing the sewer section like a staircase is necessary. We therefore obtain inflow sections which are adapted to the lie of the land and sections which, having a somewhat larger diameter, are laid flat and arranged in a cascade.

In addition, the installation of technical equipment, namely the newly developed sewer retention diaphragm, is necessary. If this diaphragm were not to be introduced, there would be no outflow retardation and hence no utilization of the usable sewer retention volume. By installing the diaphragm, the accumulating rainwater is held back, and a quantity of only 14 l/s from a total of 39 l/s accumulating is passed on. The outflow retardation that is produced in this way makes the outflow more uniform, and at the same time reduces the peak outflow.

In order to produce the cascades in view of the lie of the land, which is certainly steep, drop manholes are provided, which make it possible to incorporate the retention diaphragm.

The diaphragm is composed of a stationary, round shaped part and may be made of plastic, stainless steel or of concrete. Upstream of this stationary element, a movable part, which projects into the manhole flume, is installed in such a way that a certain minimum cross section is maintained. It is thus possible for low accumulating quantities of rainwater to be discharged without problems and without impounding.

In the event of increasing rainwater accumulation and increasing retained levels, the flow at the opening is increased, with the result that, at a retained level that is constant according to the calculation, the quantity of water which passes through the opening is that which is generally calculated as the gravity sewer outflow, that is to say $Q_{max}$.

The time which is needed in order to achieve the maximum retained level is the time frame within which the outflow retardation is established, and also the phase in which the use of the retention volume is produced. This is because, during this time, that which does not flow out counts as retained.

The overflow sill enables an overflow at any time in an emergency, so that in no case is a hazardous back-up produced in the section. As a rule, however, such a blockage is ruled out, since bulky material is immediately driven to the side as a result of the rounding of the front edge.

At the floor, the flow velocities are different, in accordance with the calculated throughput and a respectively different retained level. Any deposits that arise are immediately flushed away again during normal outflow.

6.1.3 Costs

The constructional costs for the rainwater sewer that is newly to be constructed run to DM 294,000.

Without reworking the project as a retention sewer with a cascade-like arrangement, costs at the level of DM 169,000 had originally been ascertained. As a result of using the sewer as a retention sewer, the additional costs can consequently be calculated to be at the level of DM 125,000.

This makes it clear that the additional costs for changing the use of the sewer into a retention sewer are cheaper by a half in comparison with extending a rain-water retaining basin.

6.2 Project 2
6.2.1 Objective/project aim

The existing sewer section was hydraulically overloaded and of too small a size, from an earlier time.

From the point of view of the development within the catchment area, and also in view of the measure for redistributing the outflows because of overloaded adjacent regions, the newly planned sewer takes over a particular relief function.

At the same time, the risk of overloading the lower-lying regions is intended to be eliminated or reduced, and the newly allocated function of this main sewer section should not lead to increasing over-retention and back-up. By means of producing retention volumes and utilizing these, it is intended to produce outflow retardation and, at the same time, to reduce the peak outflow sharply.

6.2.2 Approaches to the solution and actions

For the specified quantity of water, on the basis of the drop present there, a cross section of DN 800 would be adequate. The sewer section would therefore be of capacious size.

With regard to the special task and the position, full of conflicts, of the underlying sewer sections, a cross section of DN 1200 instead of DN 800 was now desired by the client for the purpose of optimization.

Slight changes were made in the existing manhole, which consists of local concrete and has an adequate size. For example, a concrete diaphragm was erected above the overflow sill, transverse to the flow direction. The adjustable sewer retention diaphragm, by means of which the fine adjustment of the outflow cross section ascertained is made possible, was fitted upstream of this sill.

The overall additional costs run to about DM 35,000. The costs for the retention diaphragm and the concrete diaphragm crossmember are DM 12,000. The differential amount of DM 23,000 arose as a result of increasing the cross section of the reinforced concrete pipe, and the additional quantities excavated and backfilled. Since the road had to be renewed in any case, there were no additional costs here. Hence, with the diameter of DN 1200, about 100 m$^3$ of retention volume were produced at a price of DM 350 per m$^3$. Although, without the increase in cross section, the specific price per cubic meter of retention volume created would be about DM 200 per m$^3$, specifically DM 12,000/61 m$^3$, the benefit would have been smaller. At any rate, by comparison with new rainwater basin volumes at a price of about DM 1200 to DM 1500 per cubic meter, the construction was carried out very favorably and economically.

7. Significance of the novel development
7.1 For environmental protection The measures that are achieved in the projects described, making the outflow more uniform and reducing the peak outflow, make it possible for the spontaneous input of rainwater into watercourses to be reduced, and underlying rainwater overflows are less frequently relieved into streams and rivers, and hence protection is achieved. At the same time, as a result of making the outflow more uniform, a higher dirt loading can be transported to the sewage treatment plant, which is at the same time not more severely loaded; rather its capacity is increased as a result of the continuity in the inflow.

As a result of the reduction in the peak outflow, it is possible for points of conflict in networks to be eliminated, with the result that hazardous overloads can be reduced or avoided and hence, also, the outflow into the open or into cellars is sharply reduced.

7.2 For the communities

As a result of the provision of volumes which can be included in the calculations for rainwater treatment, the communities are able simultaneously to fulfil their intentions for rainwater treatment, without at the same time placing an extreme strain on their budget.

As a result of the elimination of points of conflict in the network, costly rebuilding, renovation and expansion measures are rendered partially unnecessary or sharply reduced in terms of their volume.

The provision for rainwater treatment, necessary in the budget, has become of a comprehensible size.

8. Summary

The method for producing a "Styx" braked outflow is used for decentralized, peripheral outflow control. Installation may be carried out in existing manholes or in manholes that have recently been constructed or are newly to be constructed.

The method of the patent application constitutes a cost-effective form of outflow control or outflow retardation in a mechanical way, so that, on the one hand, a series of objectives in the sense of protecting watercourses can be achieved and, on the other hand, cost savings can be achieved.

The course of the characteristic curve in the case of the "Styx" braked outflow without restricting the efficiency clearly shows the reduction in the peak outflow and the retardation. This produces a great contribution to environmental protection.

By means of using retention chambers, produced by the method, in existing sewers, it is possible to redimension excess stormwater basins and hence to save high investment costs. The provision of retention volumes may be produced for up to ⅓ of the costs which have to be put in place for new rainwater basins.

It is precisely in view of the savings which result from this that the method described will assume a role which gains in favor to an increasing extent. Interlinking with existing or new plans is in principle possible and will be striven for.

Further advantages, features and details of the invention emerge from the following description of preferred exemplary embodiments, as well as with reference to the drawing, in which:

FIG. 4 shows a plan view of a further exemplary embodiment of a device according to FIG. 1;

FIG. 5 shows a side view through the device according to FIG. 4, along the line V—V;

FIG. 6 shows a view of the device according to FIG. 4 in the flow direction of the wastewater;

FIG. 16 shows a side view of a further exemplary embodiment of a throttling element with a flushing box;

FIG. 17 shows a front view of the throttling element according to FIG. 16;

FIG. 18 shows a plan view of the throttling element according to FIG. 16.

FIGS. 19–68 show additions and changes to the "Styx" outflow brake system.

Figure 1:
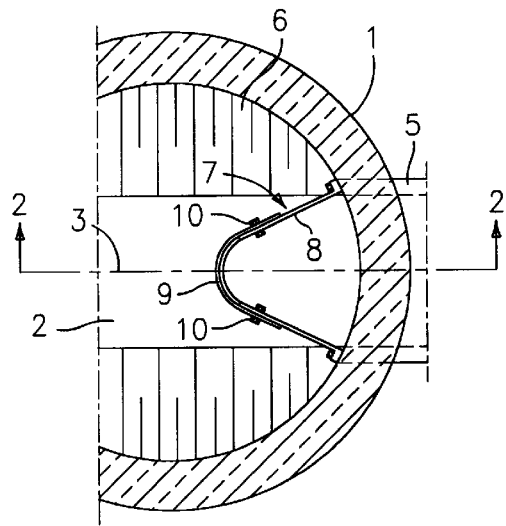
FIG. 1 shows a plan view of a part of an inventive device for activating existing reservoirs, as well as for outflow retardation in residential area wastewater management systems.

According to FIG. 1, a manhole 1 of a wastewater system is shown in part, and through this manhole the wastewater is guided into a sewer section 2 having a manhole flume floor 3.

The sewer section 2 is adjoined by an outflow opening 4 (see FIG. 3) and this is adjoined by a sewer pipe 5 that leads further.

The sewer section 2 is assigned, at its sides, continuous footings 6 that rise obliquely. The flow direction of the wastewater is identified by the arrow x (see FIG. 2). Placed upstream of the outflow opening 4, counter to the flow direction x, is a throttling element 7. The throttling element 7 comprises a self-cleaning sewer retention diaphragm 8 and an adjusting wedge diaphragm 9 that is connected to the sewer retention diaphragm 8. The adjusting wedge diaphragm 9 is connected to the sewer retention diaphragm 8 via fastening screws 10, and can be adjusted in height.

Figure 2:
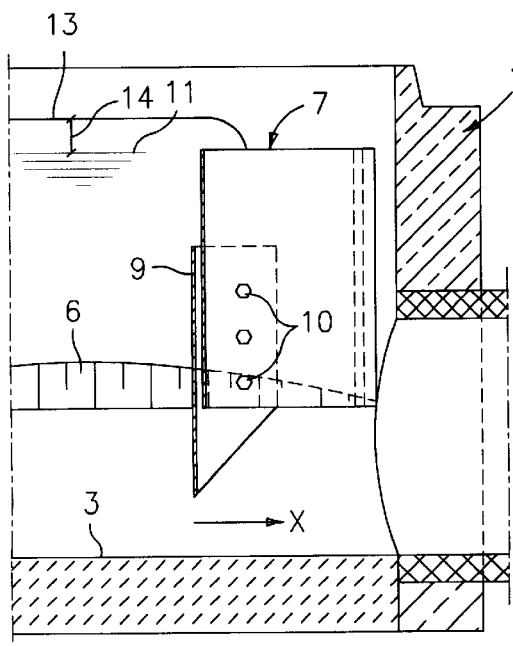
FIG. 2 shows a side view through the device according to FIG. 1, along the line II—II.

Moreover, FIG. 2 shows that the adjusting wedge diaphragm 9 and/or the sewer retention diaphragm 8 can also be arranged in an inclined manner. This is indicated by the dashed line. An inclination of the adjusting wedge diaphragm 9 and/or of the sewer retention diaphragm 8 (that is to say of the throttling element 7) also means that the length of the crest is increased in the event of water overflowing. This improves the flushing process, so that better self-cleaning occurs at the floor downstream of the crest. In addition, the result of these measures is that turbulence, which occurs in the case of a possible overflow, is minimized, and as a result hydraulically more beneficial outflow conditions are produced (for example a lower input of air into the lower-lying reach).

Figure 15:
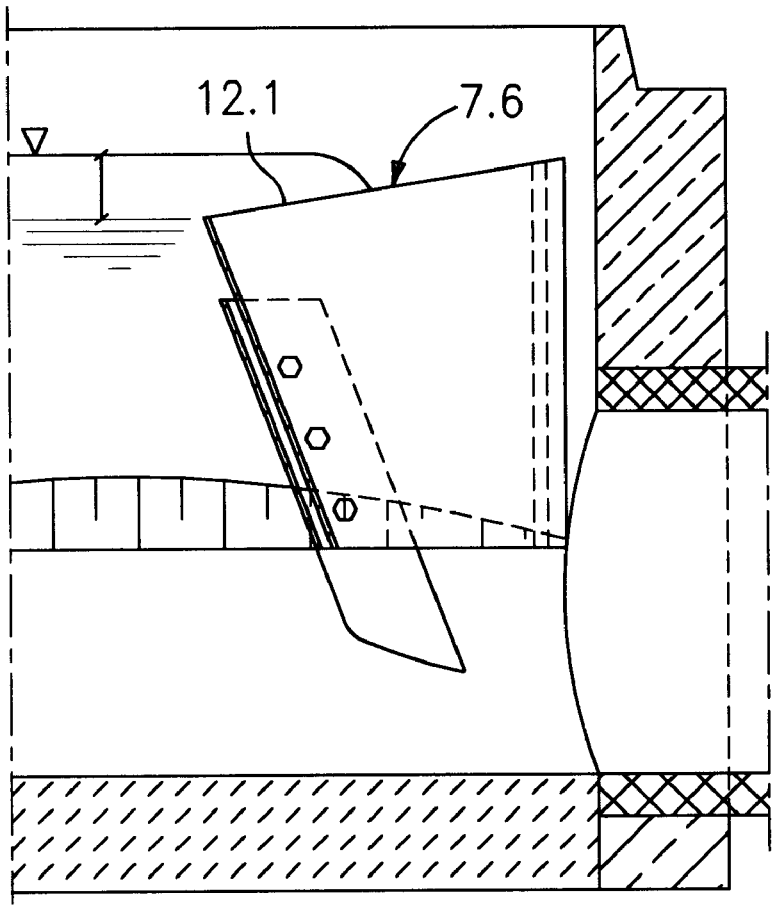
FIG. 15 shows a side view of a further exemplary embodiment of a throttling element.
Figure 19:
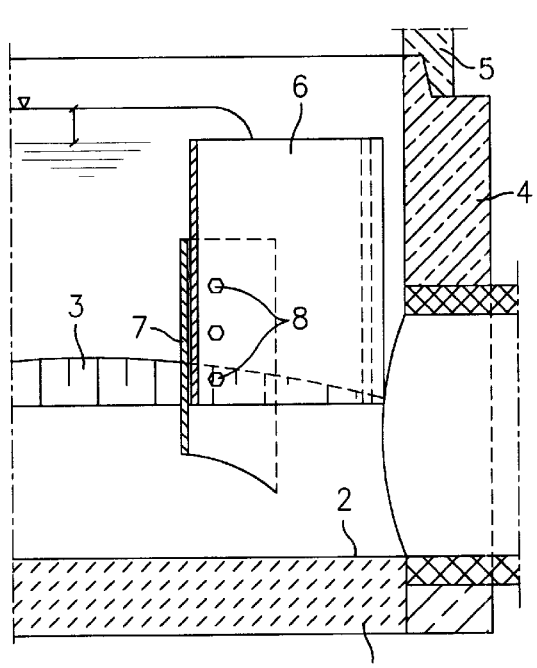
Figure 20:
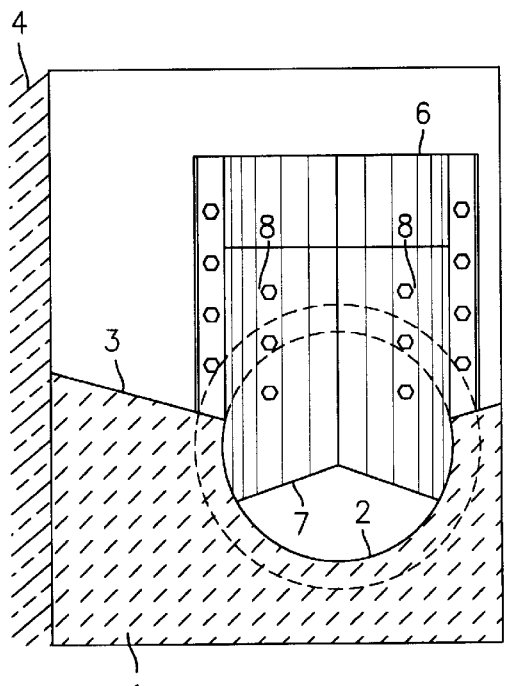
Figure 21:
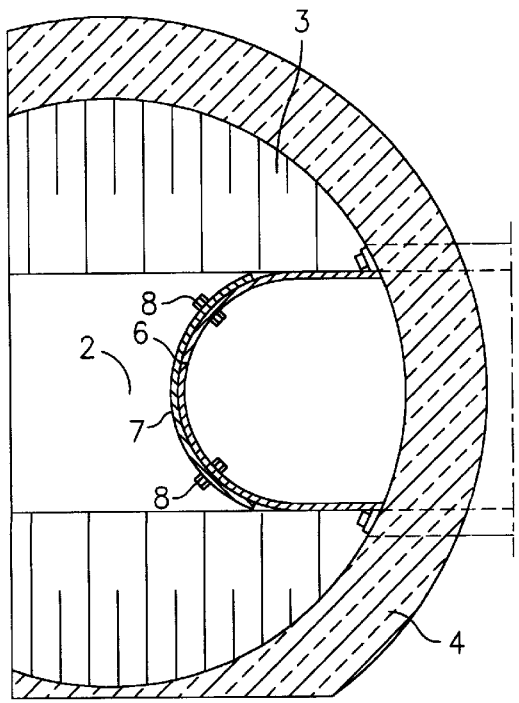
Figure 22:
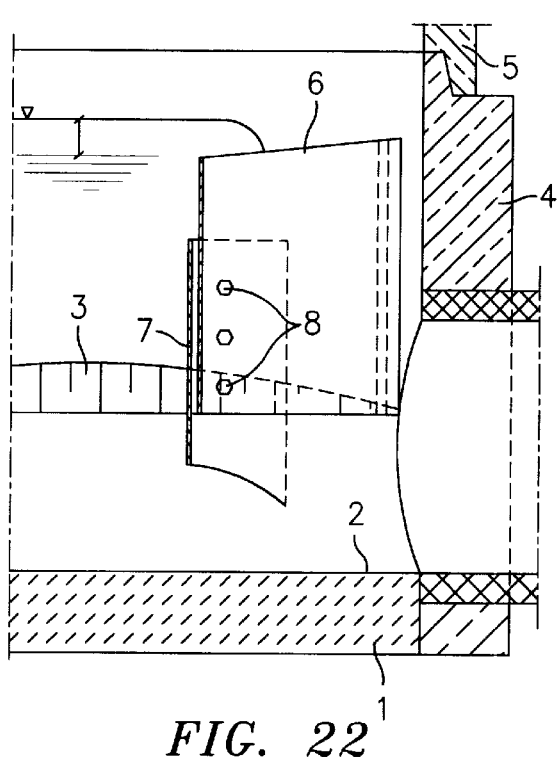
Figure 23:
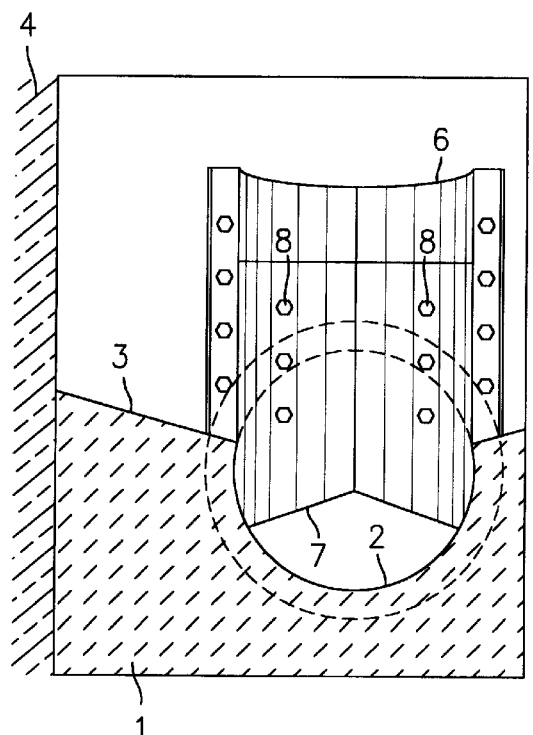
Figure 24:
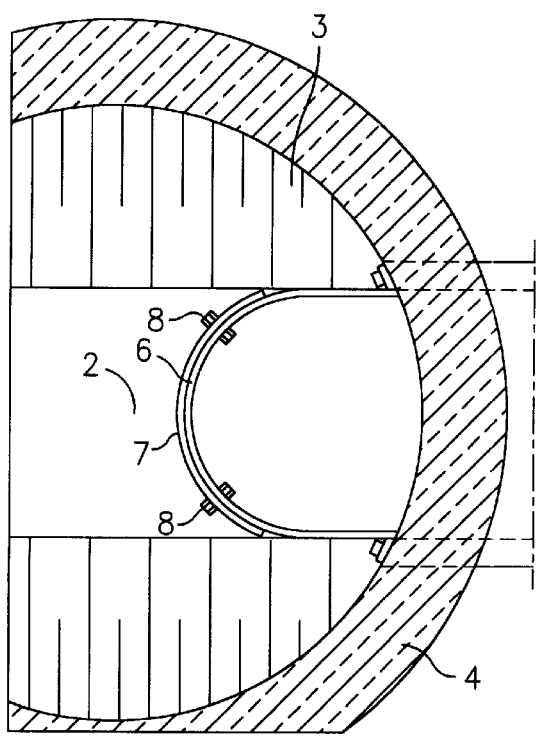
Figure 25:
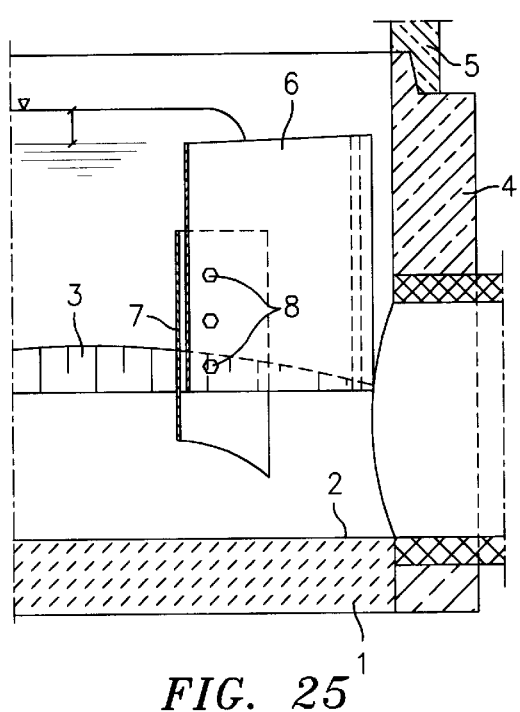
Figure 26:
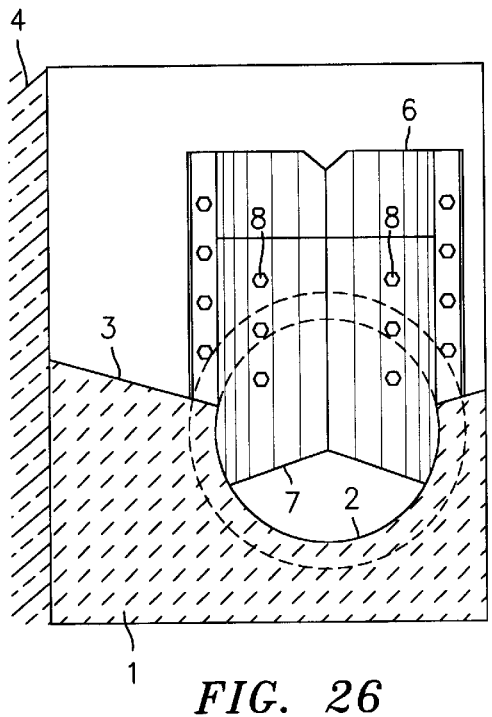
Figure 27:
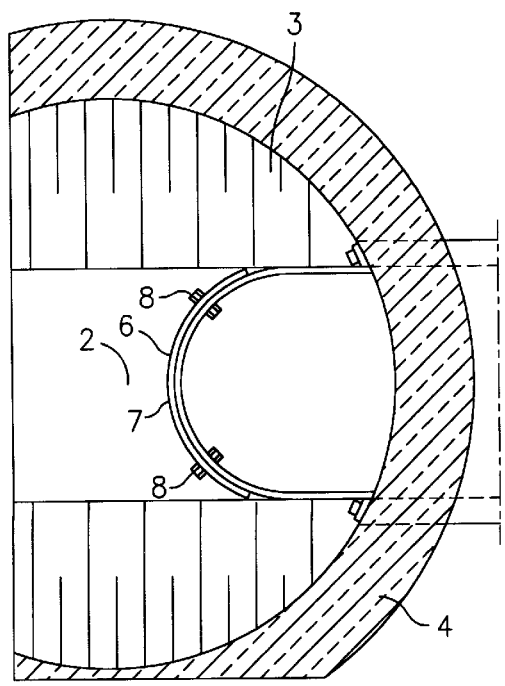
Figure 28:
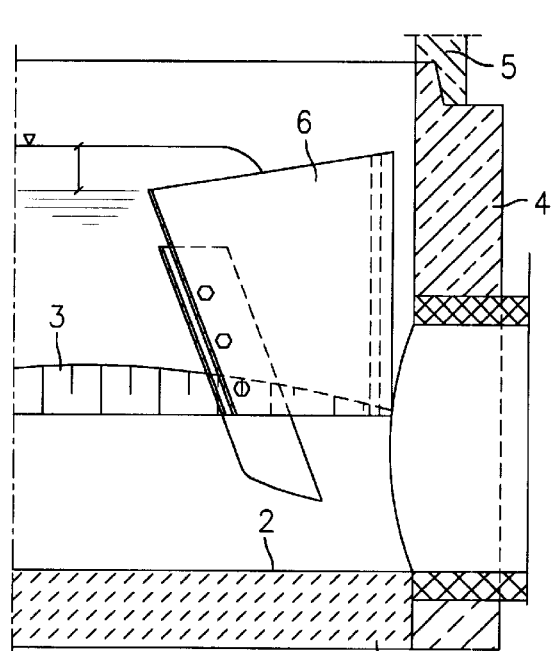
Figure 29:
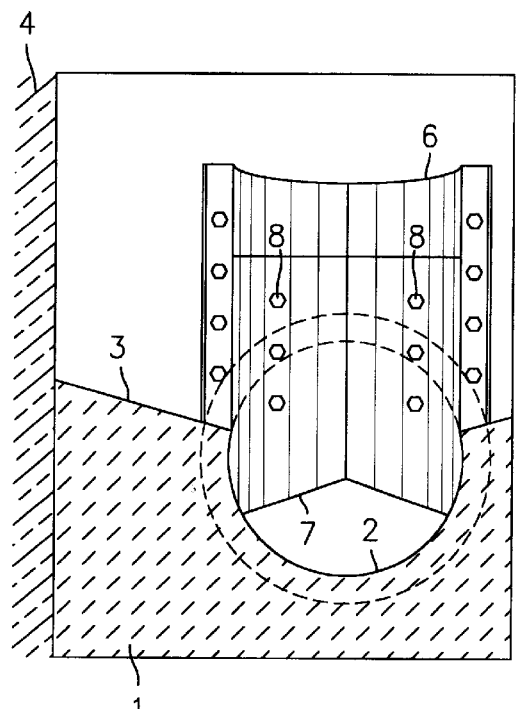
Figure 30:
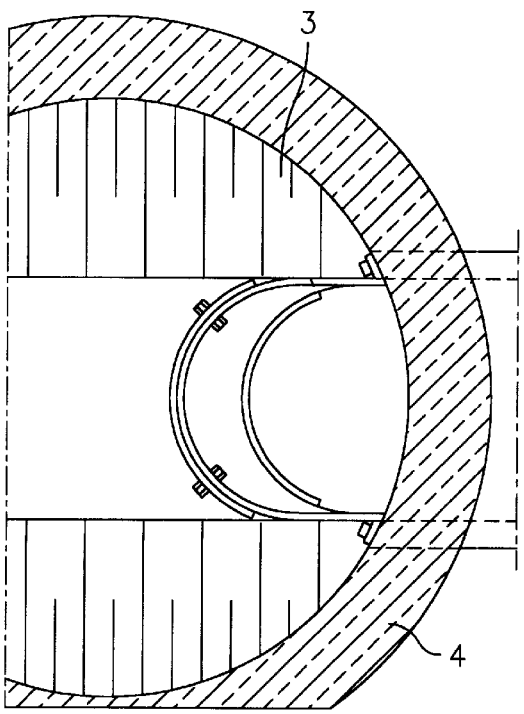
Figure 31:
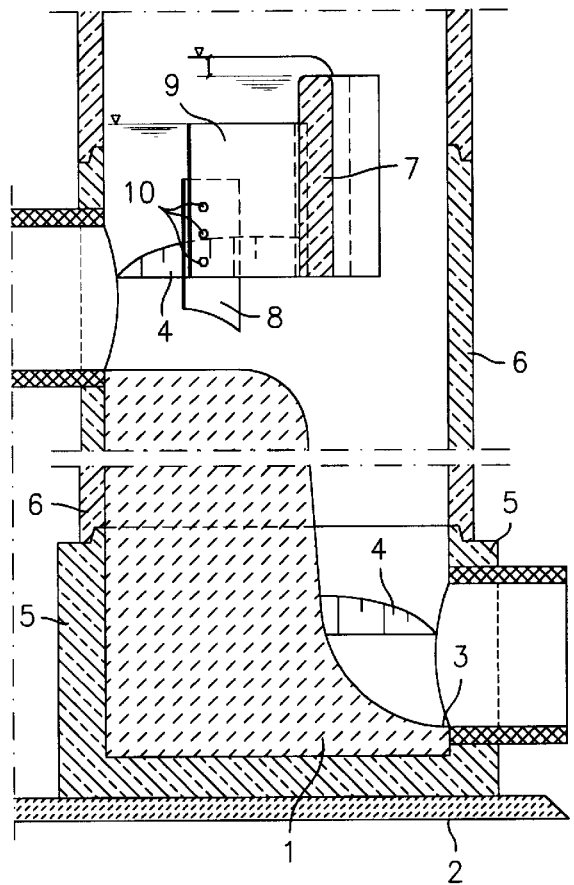
Figure 32:
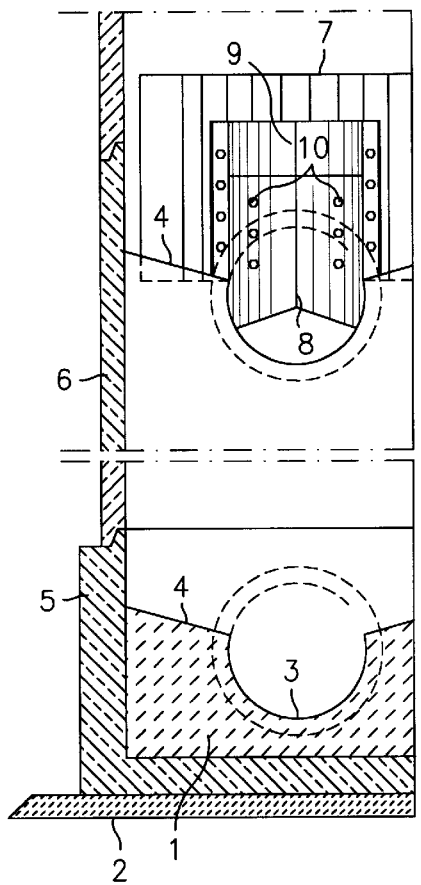
Figure 33:
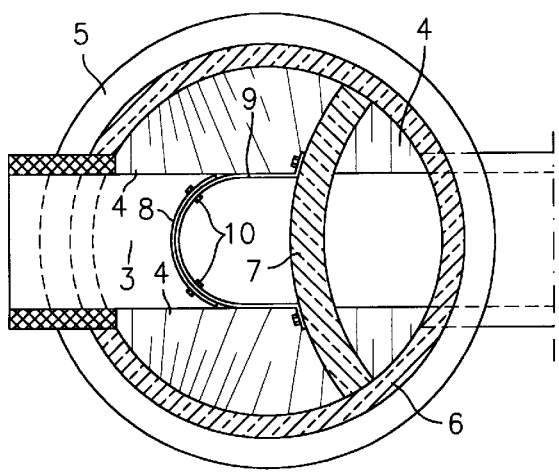
Figure 34:
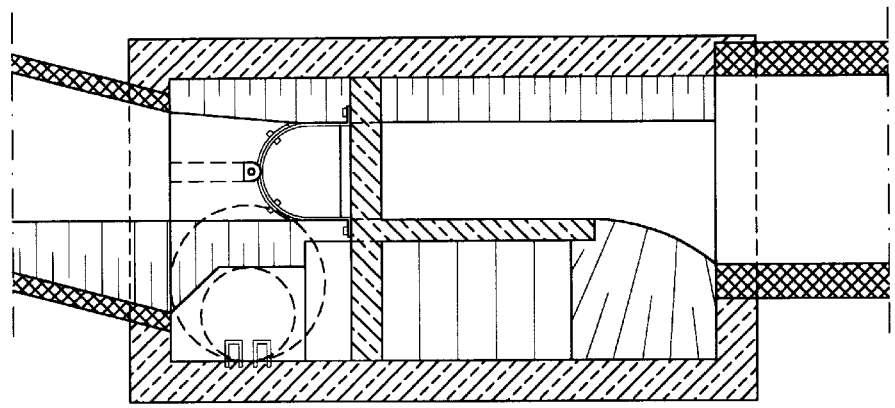
Figure 35:
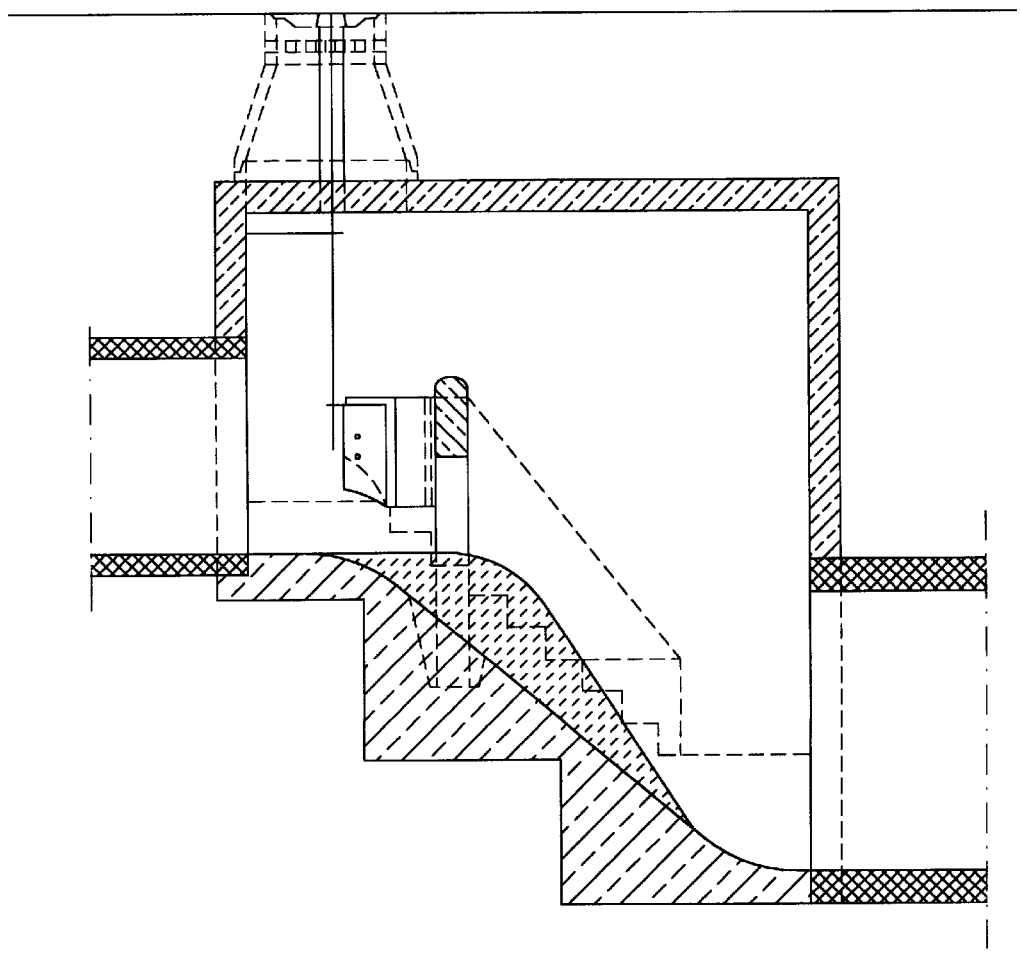
Figure 36:
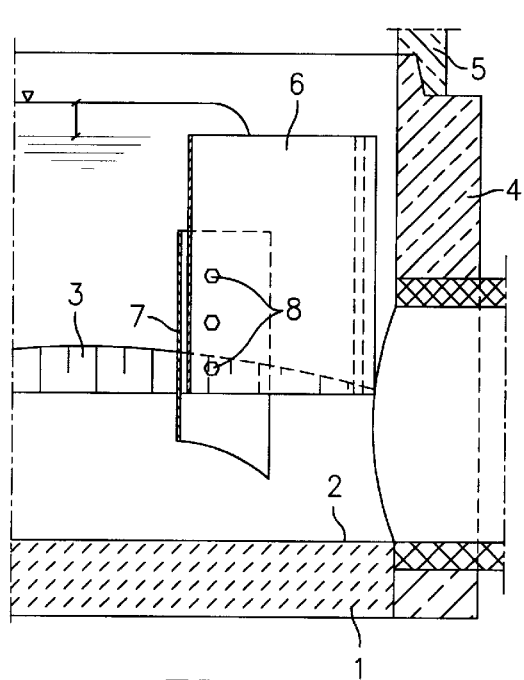
Figure 37:
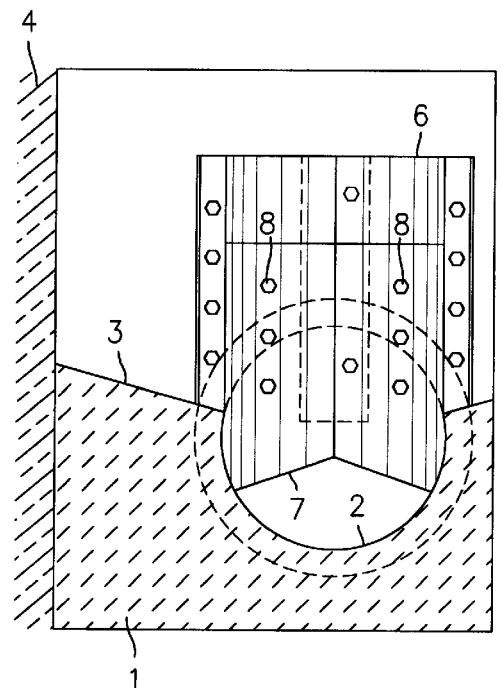
Figure 38:
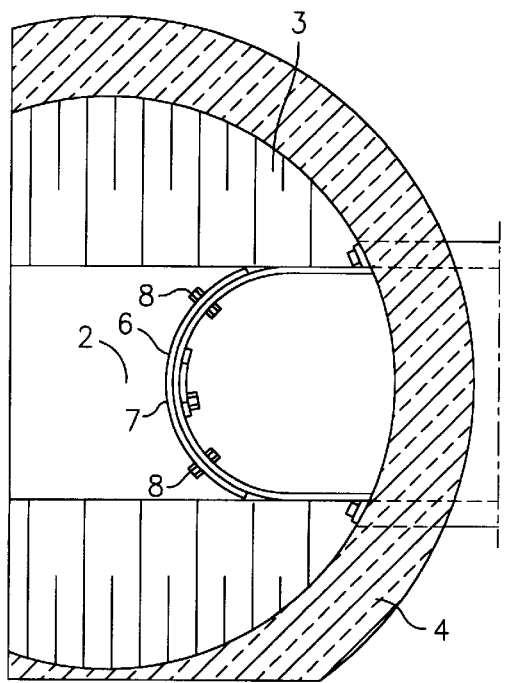
Figure 39:
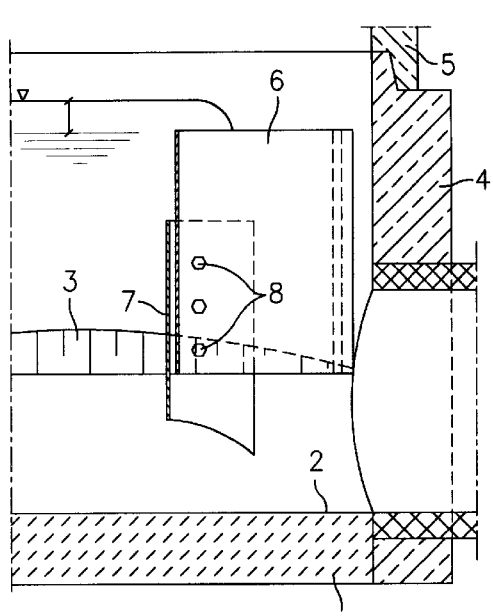
Figure 40:
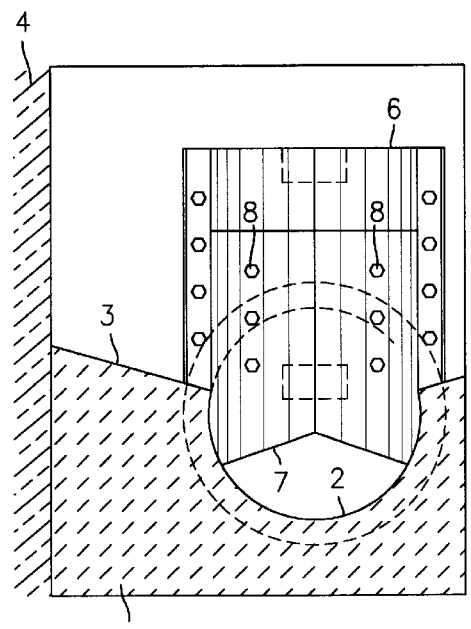
Figure 41:
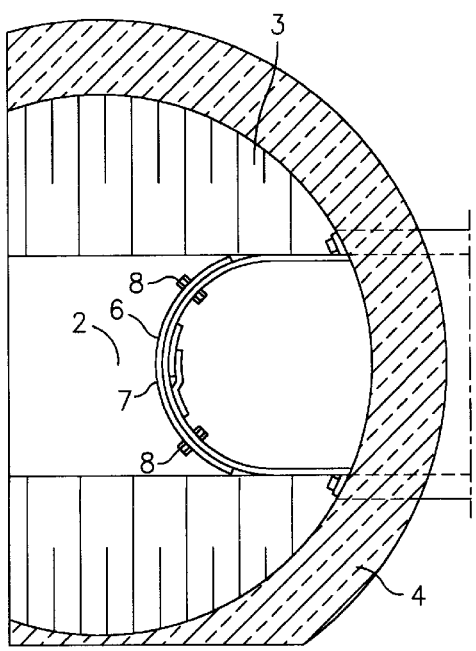
Figure 42:
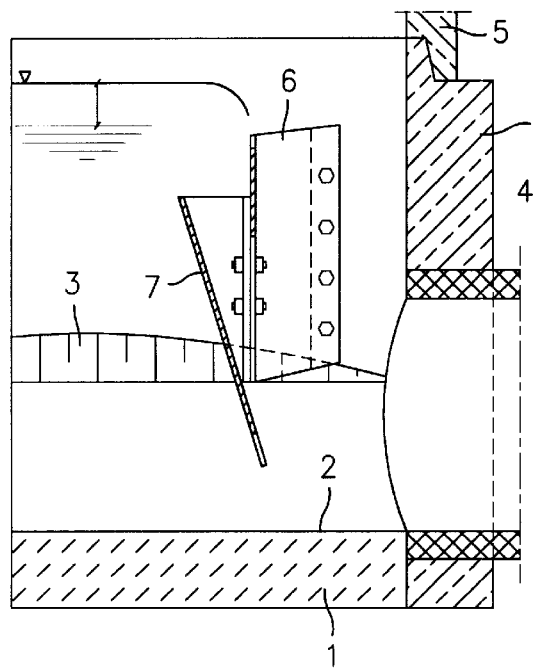
Figure 43:
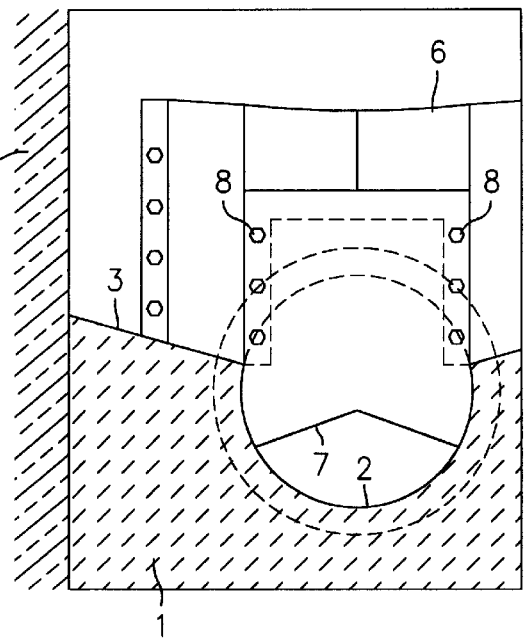
Figure 44:
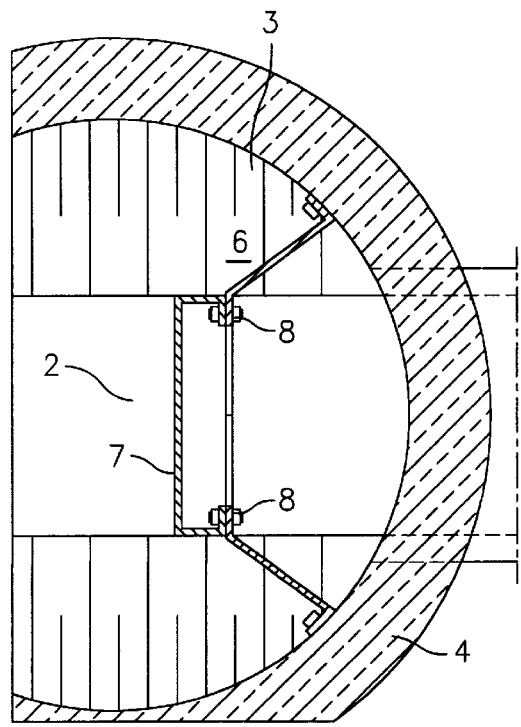
Figures 48, 49:
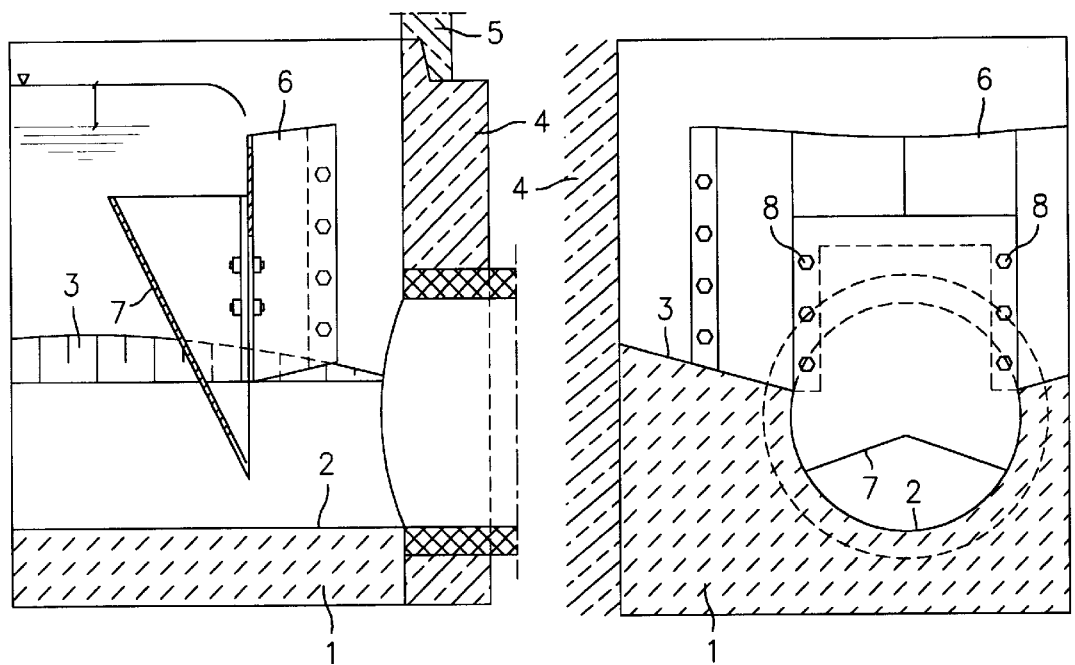
Figure 50:
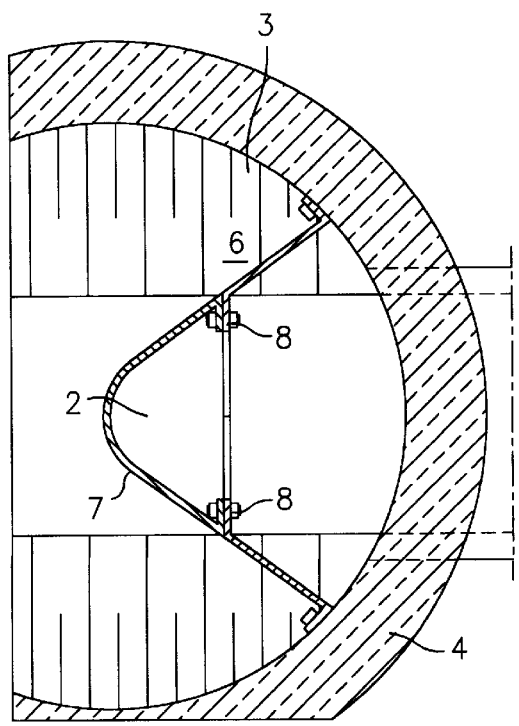
Figure 51:
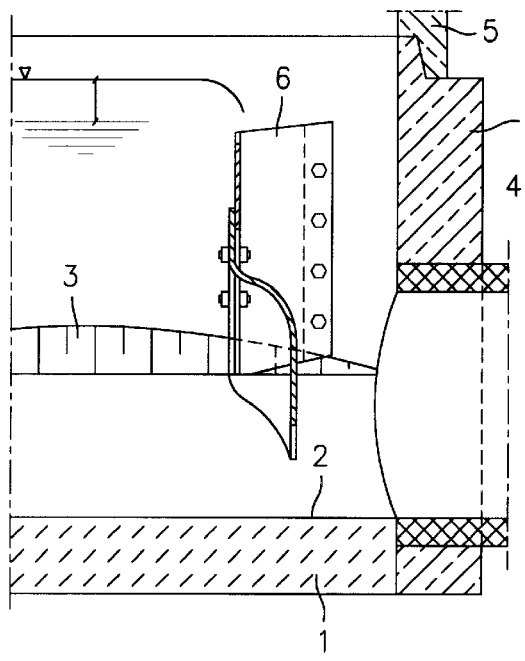
Figure 52:
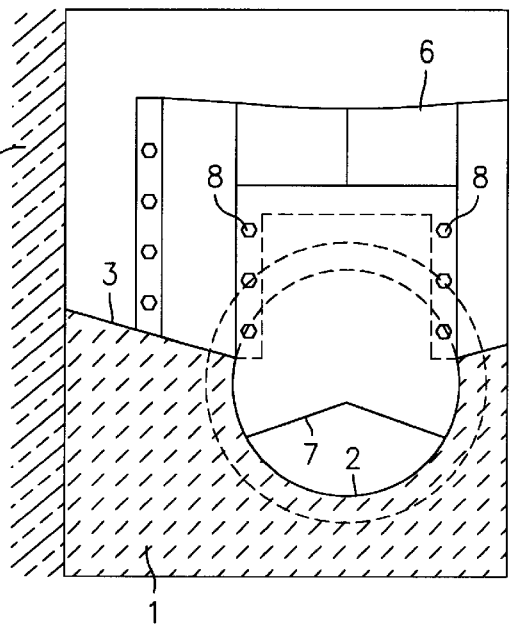
Figure 53:
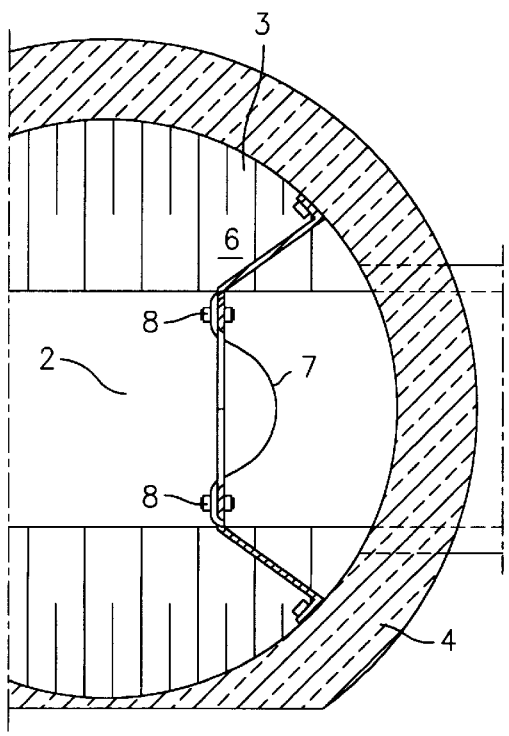
Figure 54:
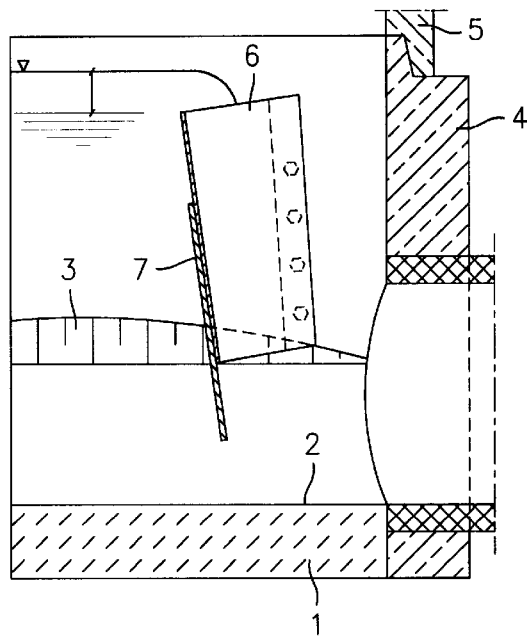
Figure 55:
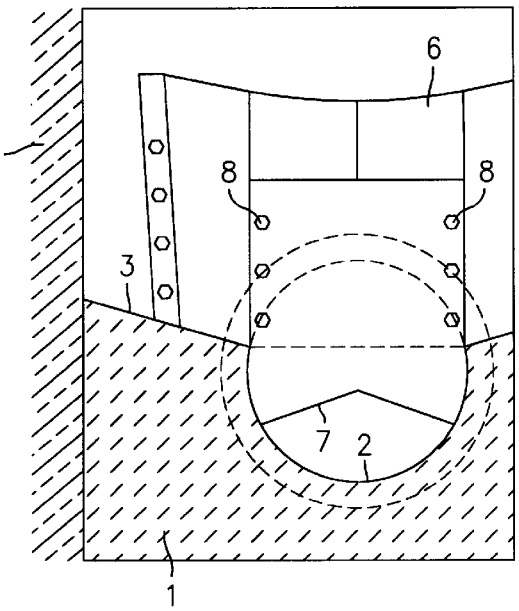
Figure 56:
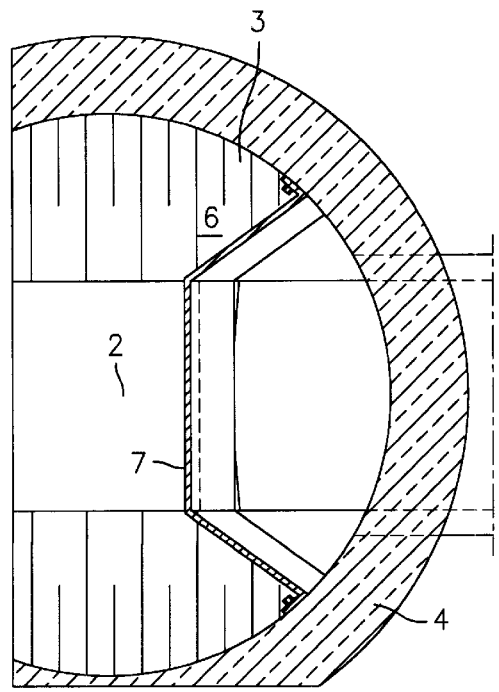
Figure 57:
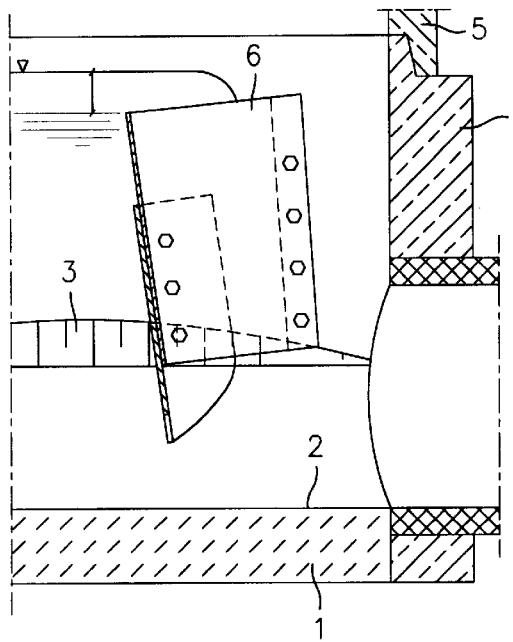
Figure 58:
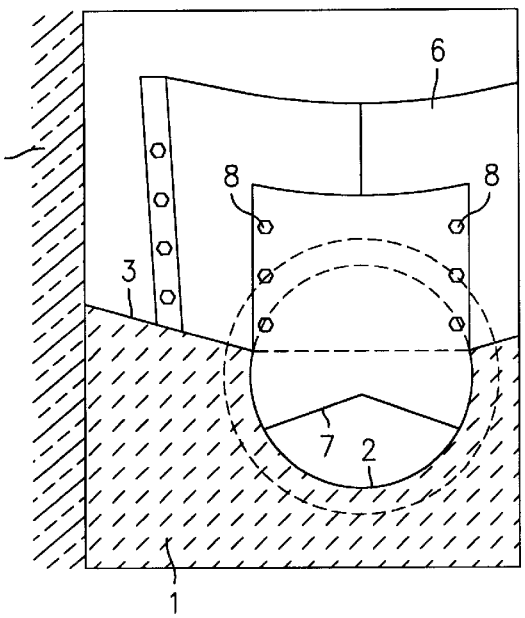
Figure 59:
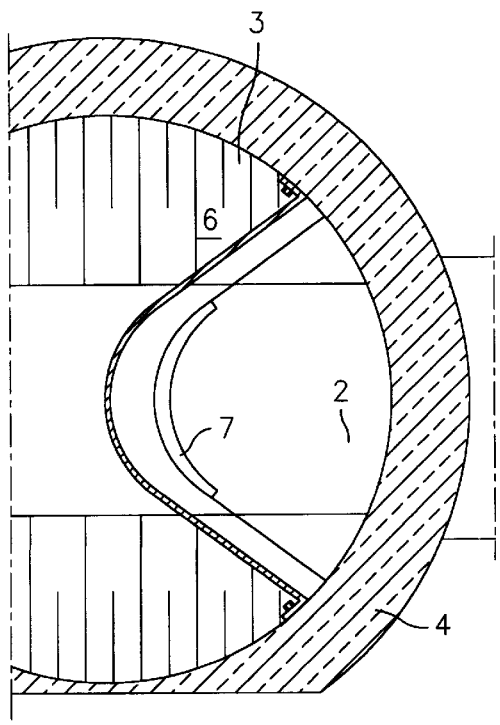
Figure 60:
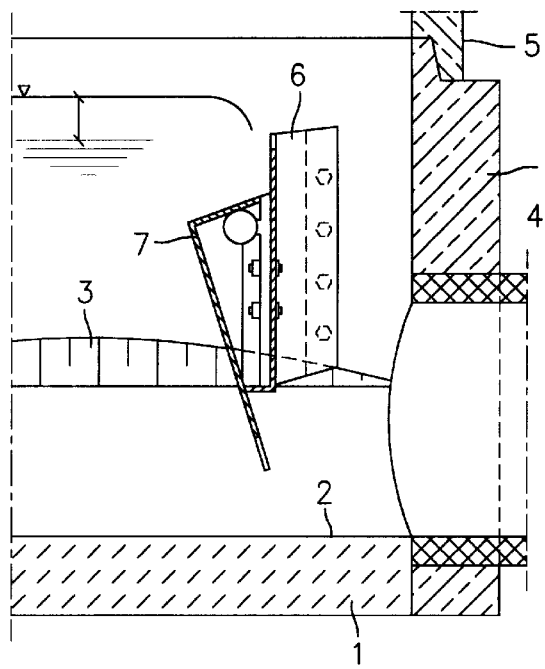
Figure 61:
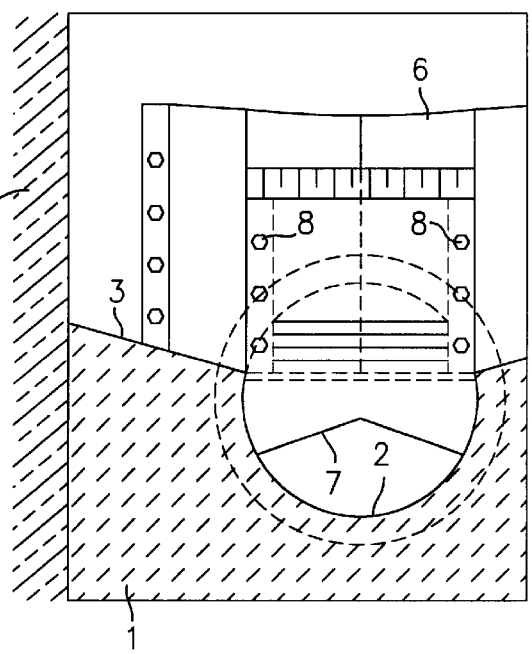
Figure 62:
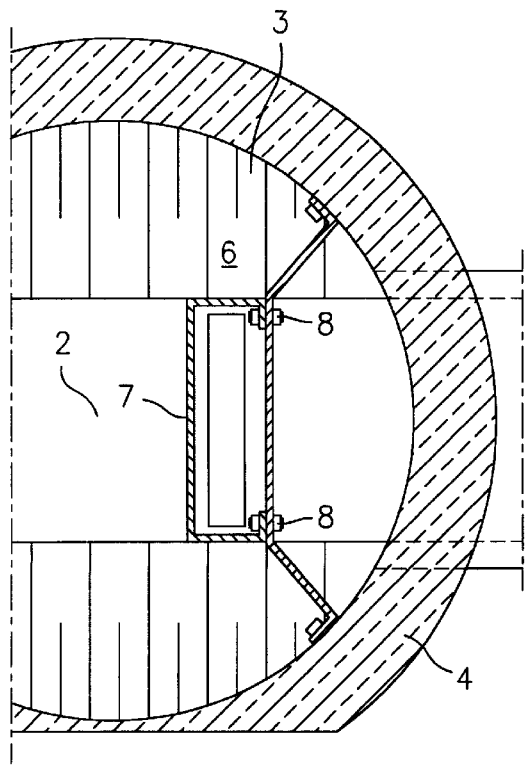
Figure 63:
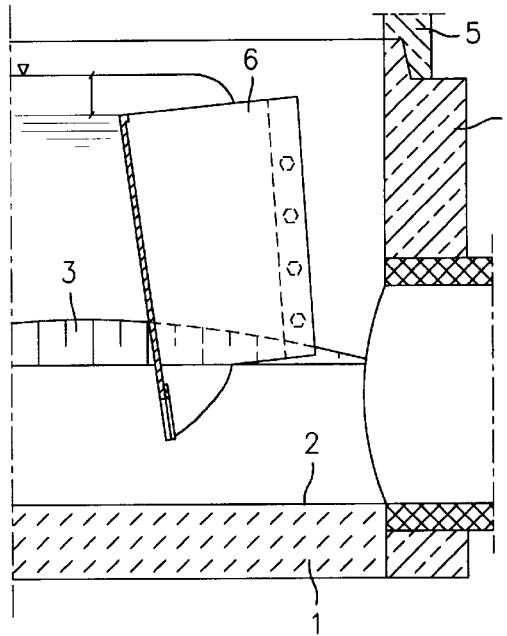
Figure 64:
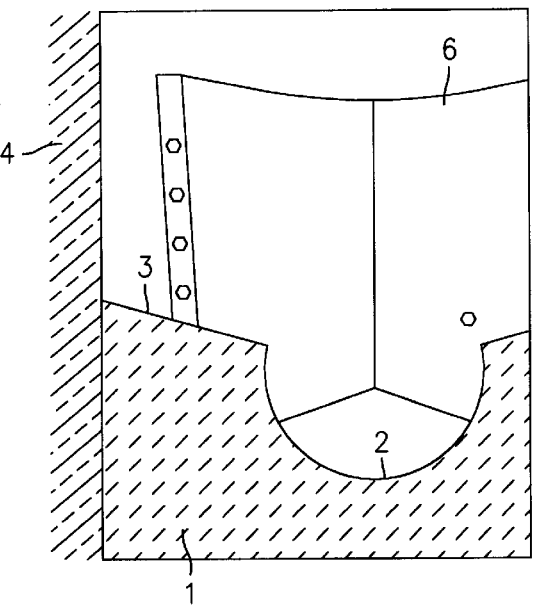
Figure 65:
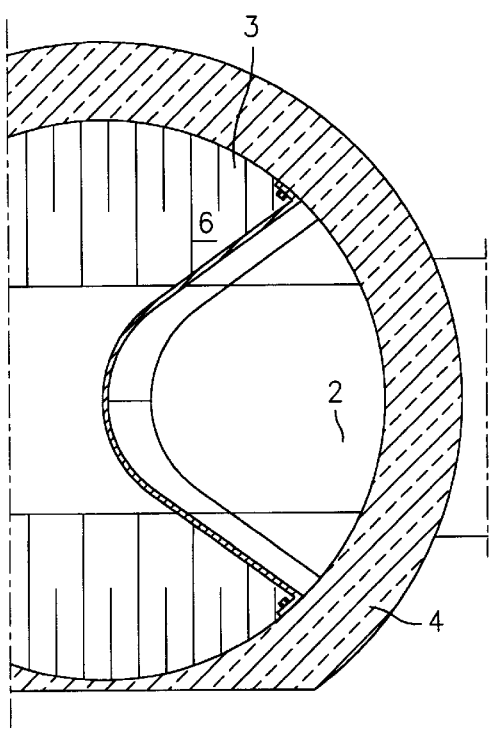
Figure 66:
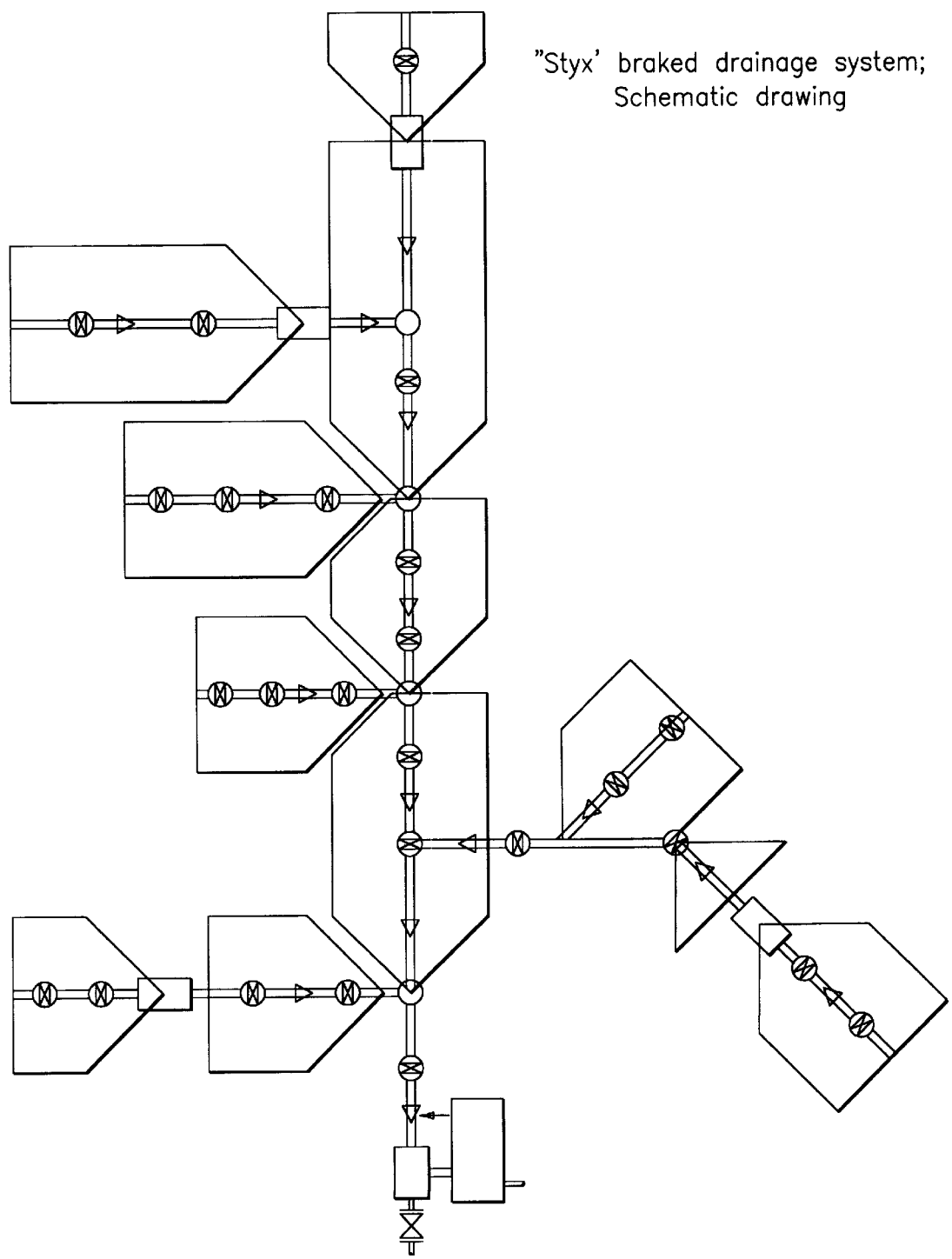
Figure 67:
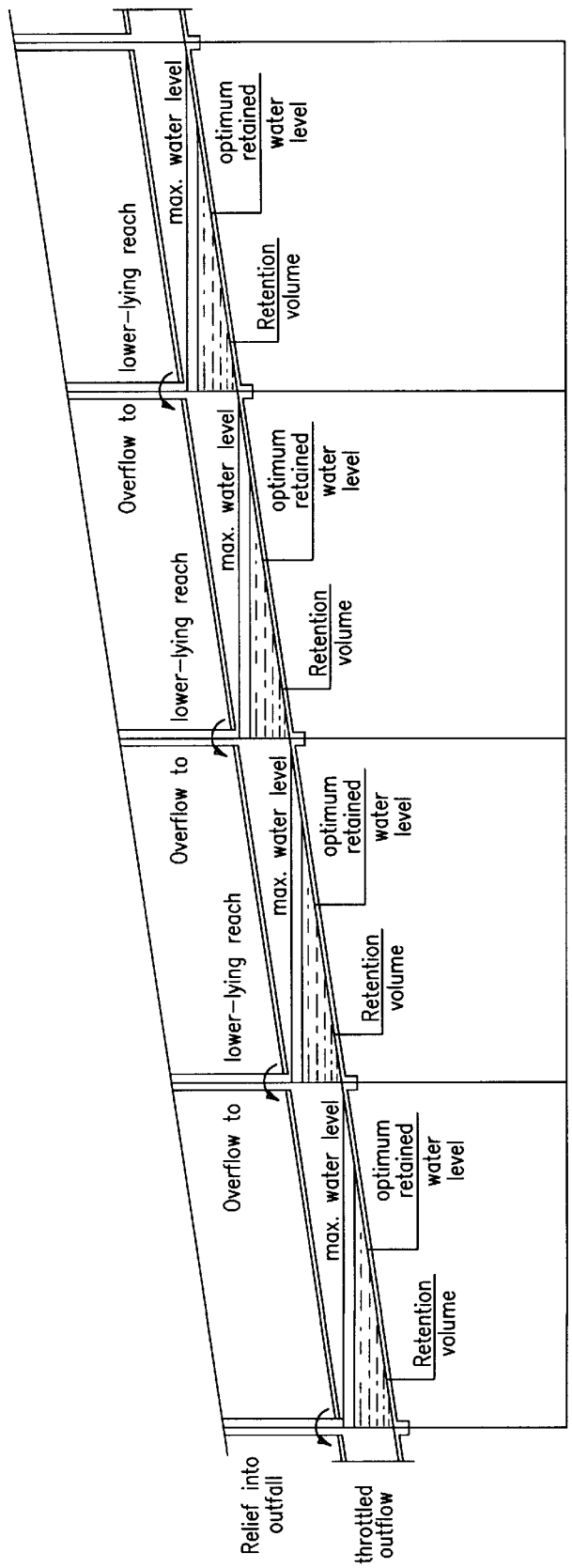

A throttling element 7.6 that is inclined in this way is also illustrated in FIG. 15. In this case, the marginal edge 12.1 is inclined downward counter to the flow direction x.

Figure 13:
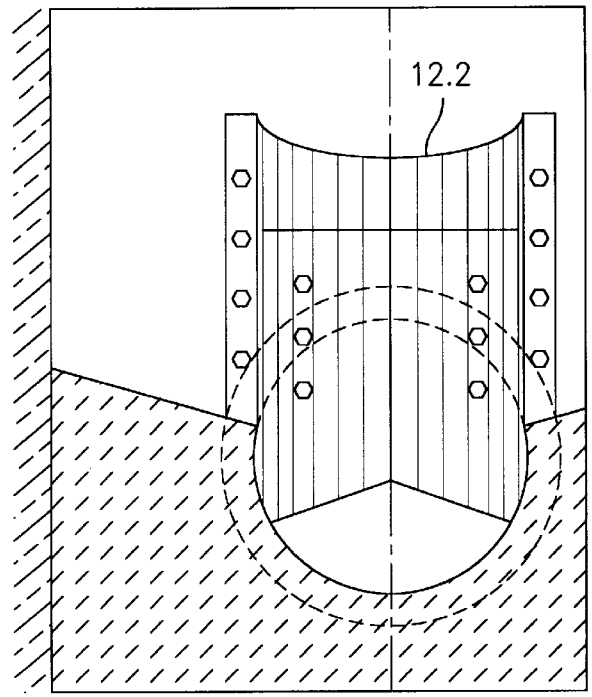
FIGS. 13 and 14 show plan views, illustrated in part, of further embodiments of throttling elements.
Figure 14:
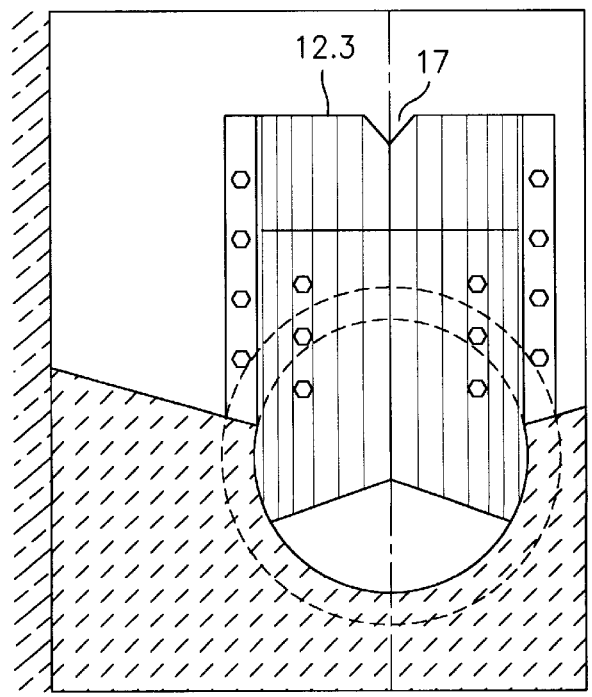

According to FIGS. 13 and 14, a similar situation is also achieved in that, although the entire throttling element is not inclined, according to FIG. 13 one marginal edge 12.2 runs in a manner inclined downward and counter to the flow direction x, or else that one marginal edge 12.3 has a notch 17. The result of these measures is intended to be that the overflow takes place in a concentrated manner, specifically at the front area of the throttling element.

The way in which the present invention functions is as follows:

Wastewater flows through the sewer section 2 toward the outflow opening 4 and through the sewer pipe 5. If the wastewater increases, then, as a result of the throttling element 7, the wastewater is backed up into the sewer system upstream of the sewer section 2. Backing up continues until a water level 11 reaches an upper marginal edge 12 of the throttling element 7. Between the water level 11 and a maximum water level 13, an overflow of water 14 is provided, which runs over the marginal edge 12 of the throttling element 7, downstream of the throttling element 7, and there passes back again into the sewer section 2.

Figure 3:
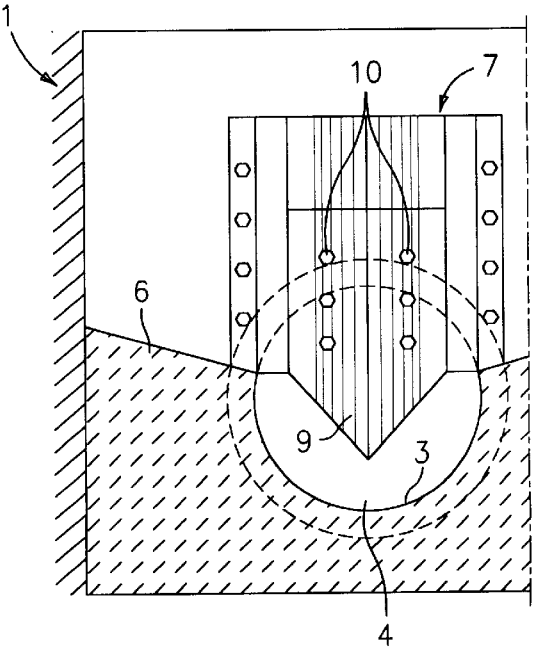
FIG. 3 shows a view of the device according to FIG. 1 in the flow direction.

The exemplary embodiment according to FIGS. 4 to 6 of a device for activating existing reservoirs and for outflow retardation within wastewater systems differs from that according to FIGS. 1 to 3 in that there is a changed shape of a sewer retention diaphragm 8.1 and of an adjusting wedge diaphragm 9.1. Whereas the shape of the sewer retention diaphragm 8 and of the adjusting wedge diaphragm 9 according to FIG. 1 is aligned counter to the flow direction x in rather a wedge shape, the shape according to FIG. 4 is a semicircular diaphragm.

Figure 7:
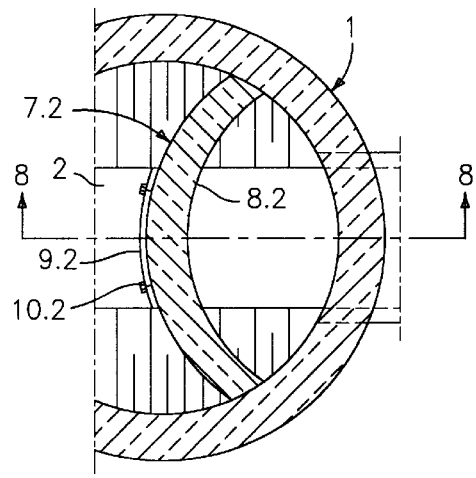
FIG. 7 shows a plan view of a further exemplary embodiment of a device according to FIG. 1.
Figures 8, 9:
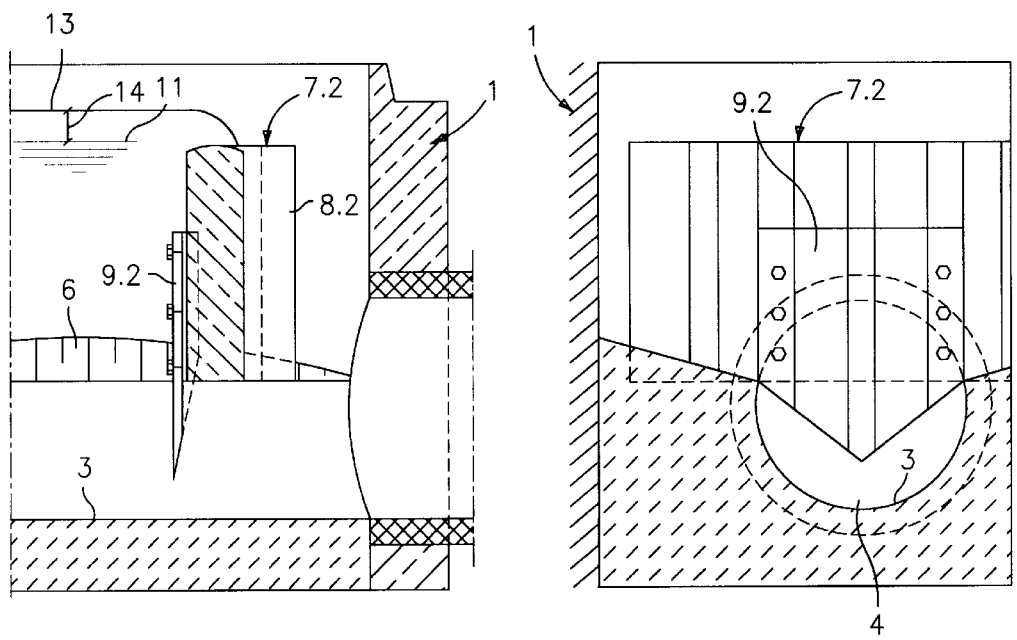
FIG. 8 shows a side view through the device according to FIG. 7, along the line VIII—VIII.
FIG. 9 shows a view of the device according to FIG. 7 in the flow direction of the wastewater.

In the case of the device for activating existing reservoirs and for outflow retardation within wastewater systems according to FIGS. 7 to 9, there is introduced into the manhole 1, as a sewer retention diaphragm 8.2, a concrete wall, which extends in a curved shape, even over the continuous footing 6. In the region of the sewer section 2, an adjusting wedge diaphragm 9.2, which may consist, for example, of sheet metal or plastic, is fixed to this sewer retention diaphragm 8.2.

Figure 10:
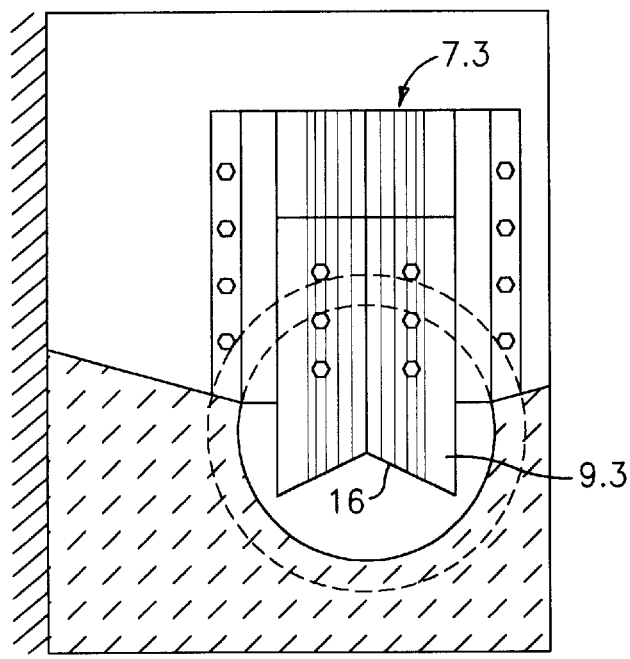
FIG. 10 shows a view of the device similar to FIG. 3 with a different adjusting wedge diaphragm.

Whereas the adjusting wedge diaphragms 9–9.2 have a wedge 15 at the bottom, this wedge dipping into the flow of wastewater, according to FIG. 10 a triangular cutout 16 in an adjusting wedge diaphragm 9.3 is provided. This triangular cutout 16 ensures that the dry weather outflow can take place unimpeded and without impounding.

In addition, coarse materials contained in the wastewater are enabled to flow out unimpeded and, as a result of maintaining the normal outflow flume, less turbulence is produced, which in turn has a hydraulically more beneficial effect on the outflow behavior.

It is preferable for the triangular cutout 16 to be configured in such a way that, being located opposite the floor, it ensures together with the latter the free passage, required by the ATV, of a ball of 200 mm diameter.

Figure 11:
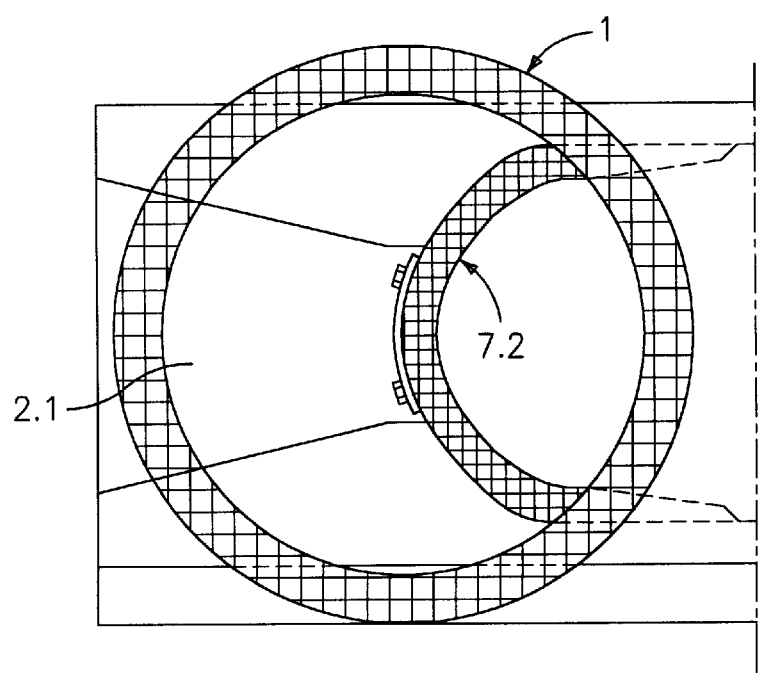
FIG. 11 shows a plan view of the exemplary embodiment of a device according to FIG. 7 with a sewer section of reduced cross section.

Shown in FIG. 11 is a device similar to FIG. 7. The sole difference is that the sewer section 2.1 does not have a continuously equal cross section but tapers in its cross section toward the throttling element 7.2. This means a relatively high partial filling cross section, which even goes as far as an approximately circular cross section, even during dry weather outflow. In this case, the flow velocity of the wastewater is increased in this region, and any possible dirt is flushed away.

Figure 12:
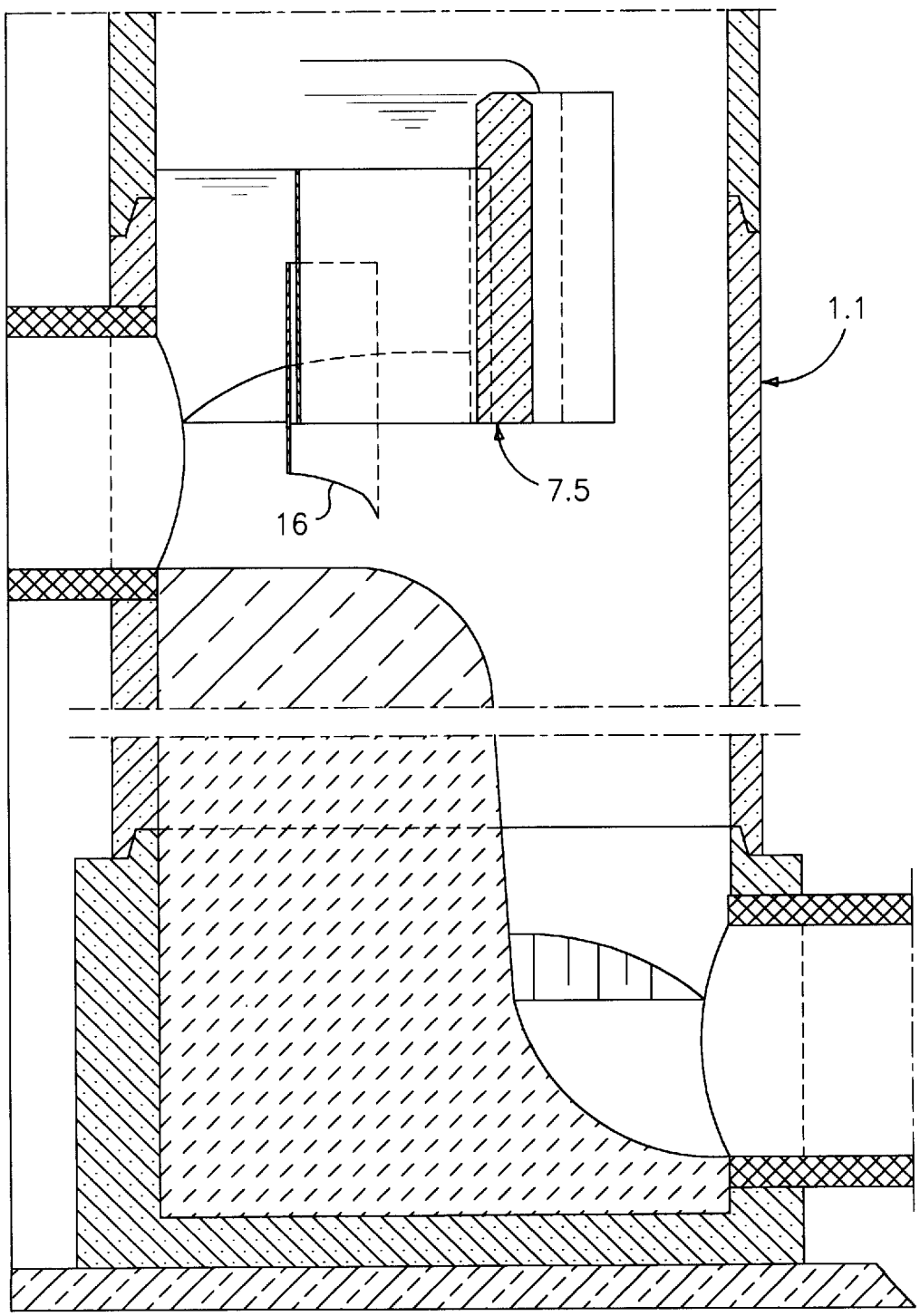
FIG. 12 shows a cross section through an inventive surge retaining shaft with incorporated throttling element.

The present invention may also be used in a surge retaining shaft 1.1, as is illustrated in FIG. 12. Indicated here, purely by way of example, is a throttling element 7.4, which is similar to that of FIGS. 7 to 9, but has a cutout 16.

These surge retaining shafts 1.1 are used primarily when bottom steps (bed drops) are required on economic and/or hydraulic grounds. The surge retaining shaft is produced from a conventional ready-made manhole, into which profiled concrete is introduced in order to form the drop flume. The throttling element is fastened to the manhole wall at the appropriate level and thus enables a build-up upstream of the drop edge.

Preferably, but not shown in FIG. 12, the throttling element, as an outflow brake, should be adjustable by means of a spindle, for example, so that the continuous setting of the outflow opening is made possible. Using the above-mentioned spindle, it is possible to carry out the regulation of the outflow opening even from outside the throttle superstructure, so that an entry into the corresponding superstructure no longer becomes necessary. In this case, the operation of the spindle is carried out from the ground upper edge of the superstructure, via a slide-valve cap. The spindle is preferably composed of a threaded rod, which makes adjustment of the outflow opening possible via a guide thread fastened to the manhole wall.

Also illustrated in FIGS. 16–18 is the possibility that a throttling element 7.7 is constructed, as least partly, as a flushing box. To this end, a chamber 18 is constructed between a sewer retention diaphragm 8.3 and an adjusting wedge diaphragm 9.4, and can be filled with water, through a permeable membrane 19, as the wastewater level rises.

In the lower region, between the adjusting wedge diaphragm 9.4 and sewer retention diaphragm 8.3, there is a flap 20, which is connected to a float 21.

A filled chamber 18 empties itself automatically as the pressure falls or as the wastewater level falls, and as a result produces final flushing of the sewer. However, it is preferable if the emptying process takes place with a delay in relation to the outflow into the sewer. This is brought about by a mechanism (not specifically shown) which controls the retarded opening operation of the closure flap 20. A surge, which finally flushes the sewer, can be produced only in this way.

After the flushing box has been emptied, the closure flap is locked as the water level rises again. The control of the locking and unlocking of the closure flap is carried out mechanically or pneumatically with the aid of the float 21, which is located inside or outside the flushing box.

What is claimed is:

1. A device for activating existing reservoirs and for retarding outflows of wastewater in a residential area wastewater management system, having a throttling element (7), which is inserted into a wastewater sewer or manhole (1) and limits a flow cross section in the sewer (2), wherein the throttling element (7–7.2) has an overflow (12, 14) via which the wastewater, after exceeding a predetermined maximum wastewater level (11) when being backed up upstream of the throttling element (7), passes into the same sewer (2) downstream of the throttling element (7).

2. The device as claimed in claim 1, wherein the throttling element (7–7.2) is composed of a sewer retention diaphragm (8–8.2) and an adjusting wedge diaphragm (9–9.2).

3. The device as claimed in claim 2, wherein at least the adjusting wedge diaphragm (9–9.3) is vertically adjustable.

4. The device as claimed in claim 2, wherein the sewer retention diaphragm (8–8.2) and/or the adjusting wedge diaphragm (9–9.3) is/are placed in a wedge shape or curve counter to the flow direction (x) of the wastewater.

5. The device as claimed in claim 2, wherein the sewer retention diaphragm (9.2) consists of concrete.

6. The device as claimed in claim 2, wherein the adjusting wedge diaphragm (9–9.3) has a wedge (15) or a wedge-shaped cutout (16) that dips into the wastewater.

7. The device as claimed in claim 1, wherein the throttling element (7–7.2) is arranged so as to be inclined in the flow direction (x).

8. The device as claimed in one of claims 2–7, wherein the sewer retention diaphragm (8, 8.1) and adjusting wedge diaphragm (9–9.3) consist of sheet metal or plastic.

9. The device as claimed in claim 1, wherein a cross section of the sewer section (2) upstream of the throttling element (7.2) is continuously reduced.

10. The device as claimed in claim 1, wherein the throttling element has a marginal edge (12.2, 12.3) which is inclined counter to the flow direction and/or has a notch (17).

11. The device as claimed in claim 1, wherein a flushing box is provided at the throttling element (7.7).

* * * * *